(12) United States Patent
Pujol et al.

(10) Patent No.: US 6,412,972 B1
(45) Date of Patent: Jul. 2, 2002

(54) DIGITAL LIGHT PROTECTION APPARATUS WITH DIGITAL MICROMIRROR DEVICE AND ROTATABLE HOUSING

(75) Inventors: Roger A. Pujol, Mohegan Lake; Thomas P. Tyler, Wallkill, both of NY (US)

(73) Assignee: Altman Stage Lighting Company, Yonkers, NY (US)

( * ) Notice: Subject to any disclaimer, the term of this patent is extended or adjusted under 35 U.S.C. 154(b) by 0 days.

(21) Appl. No.: 09/458,603

(22) Filed: Dec. 10, 1999

(51) Int. Cl.[7] .............................................. F21V 21/28
(52) U.S. Cl. ..................... 362/272; 362/269; 359/292; 352/198
(58) Field of Search ................................ 362/269–274, 362/277, 280–284, 287, 322–324; 359/244, 245, 240, 238, 290–292, 298, 299, 839, 846, 855; 352/40–42, 198, 202, 232; 353/81, 84

(56) References Cited

U.S. PATENT DOCUMENTS

| | | | |
|---|---|---|---|
| 3,936,871 A | * 2/1976 | Mohon | 358/56 |
| 4,441,791 A | * 4/1984 | Hornbeck | 350/360 |
| 4,566,935 A | 1/1986 | Hornbeck | |
| 4,596,992 A | 6/1986 | Hornbeck | |
| 4,615,555 A | 10/1986 | Bateham | |
| 4,662,746 A | 5/1987 | Hornbeck | |
| 4,663,698 A | * 5/1987 | Tomlinson | 362/272 |
| 4,710,732 A | 12/1987 | Hornbeck | |
| 4,729,071 A | * 3/1988 | Solomon | 362/35 |
| 4,769,743 A | * 9/1988 | Callahan | 362/18 |
| 4,777,568 A | * 10/1988 | Solomon | 362/35 |
| 4,843,529 A | * 6/1989 | Izenour | 362/284 |
| 4,890,208 A | * 12/1989 | Izenour | 362/294 |
| 5,079,544 A | 1/1992 | DeMond et al. | |
| 5,083,857 A | 1/1992 | Hornbeck | |
| 5,096,279 A | * 3/1992 | Hornbeck et al. | 359/230 |
| 5,105,299 A | 4/1992 | Anderson et al. | |
| 5,192,946 A | 3/1993 | Thompson et al. | |
| 5,285,363 A | * 2/1994 | Meuse | 362/293 |
| 5,311,349 A | 5/1994 | Anderson et al. | |
| 5,467,146 A | 11/1995 | Huang et al. | |
| 5,535,047 A | 7/1996 | Hornbeck | |
| 5,548,443 A | 8/1996 | Huang | |
| 5,583,688 A | 12/1996 | Hornbeck | |
| 5,600,383 A | 2/1997 | Hornbeck | |
| 5,612,753 A | 3/1997 | Poradish et al. | |
| 5,617,243 A | * 4/1997 | Yamazaki et al. | 359/309 |
| 5,658,063 A | 8/1997 | Nasserbakht | |
| 5,670,977 A | 9/1997 | Chiu et al. | |
| 5,680,257 A | 10/1997 | Anderson | |
| 5,706,061 A | 1/1998 | Marshall et al. | |
| 5,796,526 A | 8/1998 | Anderson | |
| 5,828,485 A | * 10/1998 | Hewlett | 359/291 |

OTHER PUBLICATIONS

Analysis of Electronic Cinema Projection with the Texas Instruments Digital Micromirror Device™ Display System, Gregory Hewlett and William Werner, SMPTE, 1995, pp. 1–10.*

Display System Architectures for Digital Micromirror Device Based Projectors, James M. Florence & Lars A. Yoder, SPIE 2650, pp. 193–208.

* cited by examiner

Primary Examiner—Sandra O'Shea
Assistant Examiner—Ismael Negron
(74) Attorney, Agent, or Firm—Lackenbach Siegel, LLP

(57) ABSTRACT

There is provided a digital light projection apparatus for projecting digitally selected light beams onto a stage display to create the effect of a continuously moving image. The apparatus has a fixed housing with a luminaire and a deformable micromirror device and a rotatable housing with a fixed mirror and a rotatable mirror. The deformable micromirror device directs selected light beams generated by the luminaire to the fixed and rotatable mirrors for projection to a stage display. Color may be achieved by use of color wheels, chromatic prisms, and/or lasers.

33 Claims, 19 Drawing Sheets

DIGITAL LIGHT PROTECTION APPARATUS WITH DIGITAL MICROMIRROR DEVICE AND ROTATABLE HOUSING

FIELD OF THE INVENTION

This invention relates in general to lighting for stage productions and more particularly to image projection onto a stage.

BACKGROUND OF THE INVENTION

Lighting for stage productions, especially lighting for large scale productions for mass audiences such as rock concerts that require highly charged, intense atmospheres, is generally based upon a dual lighting system. The basic lighting is the spotlight that illuminates the performers as they move around the stage. In backup tandem with the spotlight is an image-casting lighting system that projects onto the stage continuous moving images that are aimed at a display area of the stage. The present system of moving image projection uses the common film projector used in movie theaters.

The spotlight luminaire and the associated beam modification devices such as the lens and an optional color wheel are presently mounted in a single spotlight housing that is compact and of such a weight that it can be moved about horizontal and vertical axes that enable the spotlight to cast its beam upon and follow a performer about the stage. In large scale stage productions exemplified by rock concerts the movements of the housing for the spotlight is motor driven in conjunction with a computer program created for the particular show so that the beam is moved about the stage in predetermined areas. The performer in turn has been rehearsed to move about the stage in synchronization with the beam so that what appears to be spontaneous movements by the performer are in fact based upon the performer anticipating the automatic placements of the spotlight.

In contrast with the dynamic flow of the performer and the spotlight beam is the static situation of moving image projection. Film projectors are much too heavy to be placed in a housing that can be moved either horizontally or vertically much less a combination of both. In present stage productions a film projector is placed upon a table, and a luminaire casts the beam of the moving images through the moving film in a manner known in the art onto a stage display, generally a rear surface of the stage that occupies only a limited area of the stage. The static nature of such a moving image display cannot be overcome by the moving images themselves since the display itself must be stationary as in a film theater. This static effect is not in harmony with the effect of the highly charged energy that accompanies and enhances the music of rock concerts and other similar public events.

A recent innovation in image display is the deformable mirror device, which will be referred herein as DMD, that is in the general field known as the spatial light modulator (SLM). In general, the DMD is a Micro-Opto-Electro-Mechanical Structures (MOEMS) device that is used for a high quality projection. An early version of the DMD is described in U.S. Pat. No. 4,662,746 issued to Hornbeck on May 5, 1987. This invention describes an array of mirror elements, described therein as pixels, that are cantilevered by addressing electric circuitry and resulting electrostatic force that induces a mirror cell position that reflects a light beam from a direction away from a display to a mirror cell position that directs a reflected digital light beam onto a display. This patent is incorporated by references into the present application.

Improvements to the early DMDs are described in particular in U.S. Pat. No. 5,083,857 issued to Hornbeck on Jan. 28, 1992, U.S. Pat. No. 5,535,047 issued to Hornbeck on Jul. 9, 1996, and U.S. Pat. No. 5,600,383 issued to Hornbeck on Feb. 4, 1997, which describe a DMD pixel array that includes each mirror attached to an underlying yoke connected to torsion hinges. These named patents are incorporated by reference into the present application and made a part of herein.

The entire mirror array of the DMD is basically of one unit with the cell mirrors being addressed by circuitry and electrodes. The mirrors are bistable and movable at digital rates far in excess of the critical flicker frequency (CFF) of the human eye. In the DMD projection system, the human eye acts as the final digital signal to analog signal converter for transmission to the human brain. Electronic circuitry and receiver, converter, memory, and processor coupled to the DMD are described in U.S. Pat. No. 5,079,544 issued to DeMond and Thompson on Jan. 7, 1992 and in U.S. Pat. No. 5,192,946 issued to Thompson and DeMond on May 9, 1993. These patents are incorporated by reference into and are made a part of the present application.

In addition, U.S. Pat. Nos. 4,441,791; 4,710,732; 4,596,992; 4,615,595; 4,662,746 issued to Hornbeck showing deformable digitally addressable mirrors are incorporated by reference into the present application.

U.S. Pat. 5,658,063 issued to Nasserbakht on Aug. 19, 1997 describes a video projection device for projecting video images onto a surface. A discussion therein of FIG. 8 therein, lines 43–67 and page 8, lines 1–35, describes a video projection system that includes a digital light processing system as described in U.S. Pat. No. 5,192,946, which has already been incorporated by reference herein.

Other patents concerning DMD technology that have general relationship to the present invention are as follows:
U.S. Pat. No. 4,566,935 on Jan. 28, 1986
U.S. Pat. No. 4,615,555 issued on Oct. 7, 1986
U.S. Pat. No. 4,662,746 issued on May 7, 1987
U.S. Pat. No. 5,583,688 issued on Dec. 10, 1987
Patents related to DMD technology in the area of optics are as follows:
U.S. Pat. No. 5,105,299 issued on Apr. 14, 1993
U.S. Pat. No. 5,311,349 issued on May 10, 1994
U.S. Pat. No. 5,467,146 issued on Nov. 14, 1995
U.S. Pat. No. 5,548,443 issued on Aug. 20, 1996
U.S. Pat. No. 5,612,753 issued on Mar. 18, 1997
U.S. Pat. No. 5,670,977 on Sep. 23, 1997
U.S. Pat. No. 5,680,257 issued to Oct. 21, 1997
U.S. Pat. No. 5,706,061 issued on Jan. 6, 1998
U.S. Pat. No. 5,796,526 issued on Aug. 18, 1998

Some of the basic advantages of DMD technology are being fully digitized, having greater resolution than the prior art, being highly adaptable to large scale displays, cost effective, light weight, and compact.

Although all the listed advantages of DMD technology are highly desirable, the fact that the DMD is light weight and compact makes it particularly suitable for replacing the heavy weight and bulky film projector used for stage productions. A primary advantage of the DMD for the stage is for projecting a large moving image display in a dynamic manner across an entire stage and not be limited to projecting a moving image in a single static area of the stage.

Coloring of a white light source can be achieved in the digitized light beam by any of several means known in the art. Various types of color wheels can be used in a manner known in the art. In addition, a spinnable color wheel having a wide range of colors can be digitized at a greater rate than the CFF of the human eye. Coloring of a digitized light beam can also be achieved by a single laser or a three-way laser of the three primary colors. Such coloring techniques are described in U.S. Pat. No. 5,079,544 and U.S. Pat. No. 5,192,946, page 14, line 30–49, earlier incorporated herein and made a part of the present application. Coloring of a single laser light beam can be achieved by digitizing the single laser at a frequency less ED than the color integration time for color for the human eye. A discussion of the integration time for the human eye for color, which differs from the CFF of the human eye, is set forth on page 12, lines 61–68, of U.S. Pat. No. 5,192,946.

Other structures can be used to add coloring to the DMD light display systems. Beam-splitting prisms can split white light into various components of the visible electromagnetic spectrum as described in the following paper: "Display System Architectures for Digital Micromirror Device (DMDTM)Based Projectors," by James M. Florence and Lars A Yoder, SPIE, Vol. 2650, pp. 193–208 (1996), which is incorporated into and made a part of the present application.

Technical papers describing DMD technology are as follows:

"Digital Light ProcessingTM for High-Brightness, High-Resolution Applications," by Larry J. Hornbeck, Texas Instruments 1997, Product #DPL-0030, Digital Video Products"

"Digital High-Brightness, High-Resolution Applications," by Larry J. Hornbeck, in Electronic Imaging, EI, Projection Displays III, co-sponsored by IS&T and SPIE, Feb. 10–12, 1997, San Jose, Calif. The above articles are incorporated into and made a part of the present application.

U.S. Pat. No. 4,729,071 issued to Solomon on Mar. 1, 1988, describes a fixed first housing that holds a luminaire and a second housing rotatable about a first axis and containing a pair of reflectors, one of which is rotatable about a second axis perpendicular to the first axis. A pan driver attached to the first housing rotates the second housing about the first axis. A tilt driver attached to the second housing rotates the rotatable mirror about the second axis. This patent is incorporated into and made a part of the present application.

SUMMARY OF THE INVENTION

The present invention provides a DMD light display system for projecting onto a stage display a digitally selected light beam having the optical effect of a continuous moving image in which objects move that comprises a fixed housing and a rotatable housing connected to and rotatable relative to the fixed housing about a first axis. A fixed mirror and a rotatable mirror rotatable about a second axis are mounted in the rotatable housing are driven by a pan motor mounted in the fixed housing and a tilt motor mounted in the rotatable housing, respectively. A deformable micromirror device (DMD) having a surface comprising an array of deformable mirror cells is mounted in the fixed first housing. A luminaire mounted in the fixed housing generates and directs a light beam that impinges upon the surface of the DMD. Control signals digitally activate selected deformable mirror cells of the DMD to reflect selected digital light beams in a first optical path in alignment with the first axis to the fixed mirror and to the rotatable mirror, which directs the digital light beams to a stage display giving the optical effect of a continuous moving images.

Digital control signals to the DMD activate selected pixels of the DMD to reflect digital imaged light beams to the stage display. The light source can be either standard lamps or arc lamps or lasers. Color is achieved by a color wheel, by lasers, or by chromatic prisms or a combination of chromatic prisms and a color wheel.

Analog data when that is the basic available data is converted to digital data at a video signal analog-to-digital image data converter. The digital image data is then prepared for application to a DMD at a DMD digital formatter. Once digital formatting is accomplished, control signals are directed to the addressing circuitry for the DMD. The DMD includes a mechanical interface and digital optics, which includes a plurality of bistable pixels. Control signals written to the addressing circuitry directs the DMD mechanical interface that controls the bistable rotations of the array of pixel mirrors that comprise the surface of the DMD. In addition the optics include color combinations associated with a color wheel or beam-splitting prisms mounted in the housing are created as directed by signals from the computer that are written to the addressing circuitry including each Static Ram (SRAM) of each DMD in synchronization with the rotations of the pixel mirrors.

The present invention will be better understood and the main objects and important features, other than those enumerated above, will become apparent when consideration is given to the following details and description, which when taken in conjunction with the annexed drawings, describes, discloses, illustrates, and shows the preferred embodiments or modifications of the present invention and what is presently considered and believed to be the best mode of practice in the principles thereof. Other embodiments or modifications are intended to be reserved especially as they fall within the scope and spirit of the subjoined claims.

DESCRIPTION OF THE PREFERRED EMBODIMENTS

Figure 1:
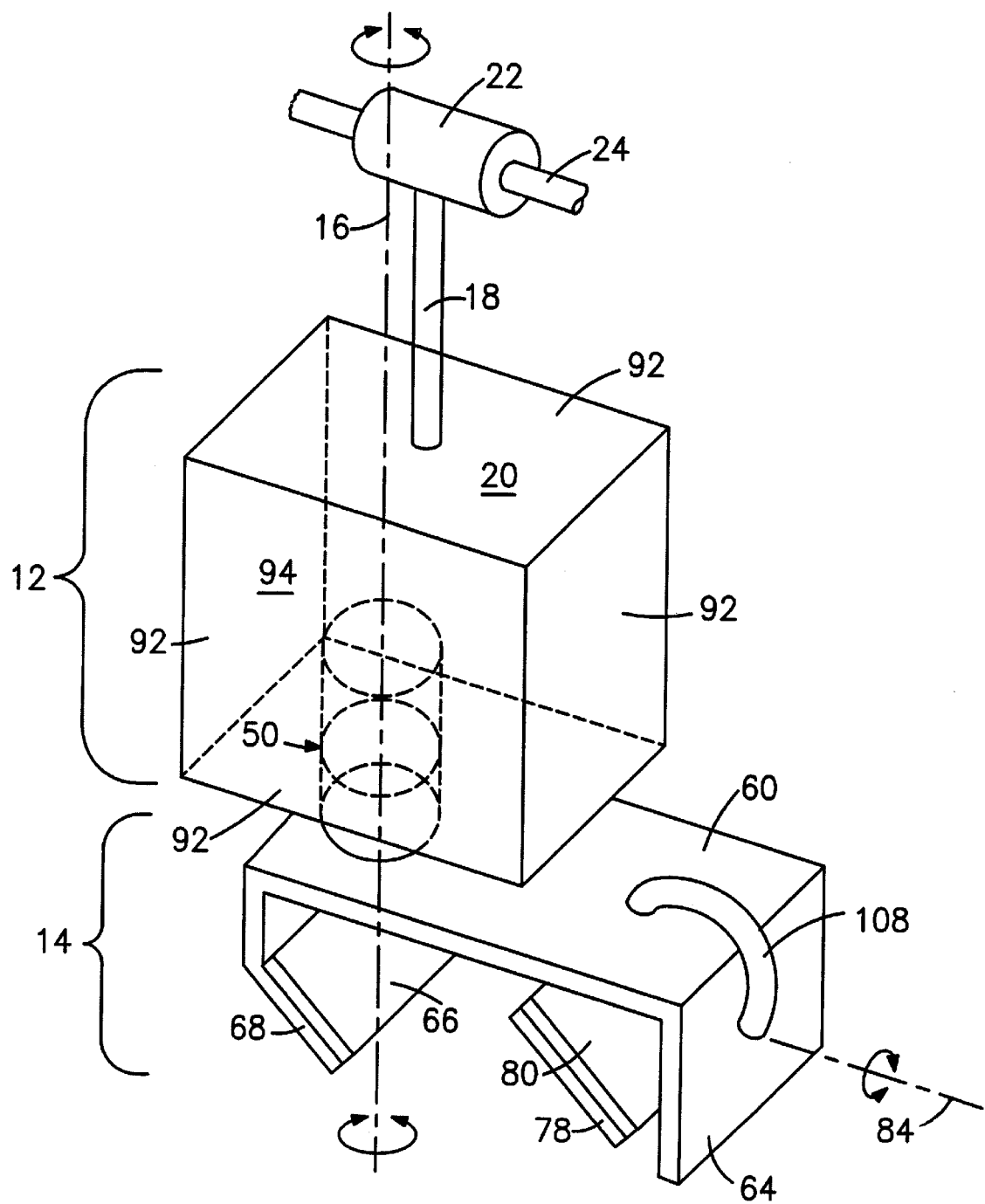
FIG. 1 is a perspective view of a low-inertial DMD stage lighting device comprising a fixed housing and a rotatable housing in accordance with the present invention with the fixed housing secured to a mounting bar.

Reference is now made to the figures and in particular to FIGS. 1–20 in which identical or similar parts are designated by the same reference numerals throughout.

A DMD light display system 10 shown in FIGS. 1 includes a stationary, or fixed, housing 12 and a rotatable housing 14 connected to and rotatable relative to fixed housing 12 about an axis of rotation 16. FIG. 1 shows fixed housing 12 positioned directly above rotatable housing 14 with axis of rotation 16 aligned in a vertical orientation. A vertical rod 18 secured to a rectangular wall 20, shown in FIG. 1 as a top wall, of fixed housing 12 connects both fixed housing 12 and rotatable housing 14 by way of a gripping ring 22 slidably connected to a horizontal bar 24.

Figure 2:
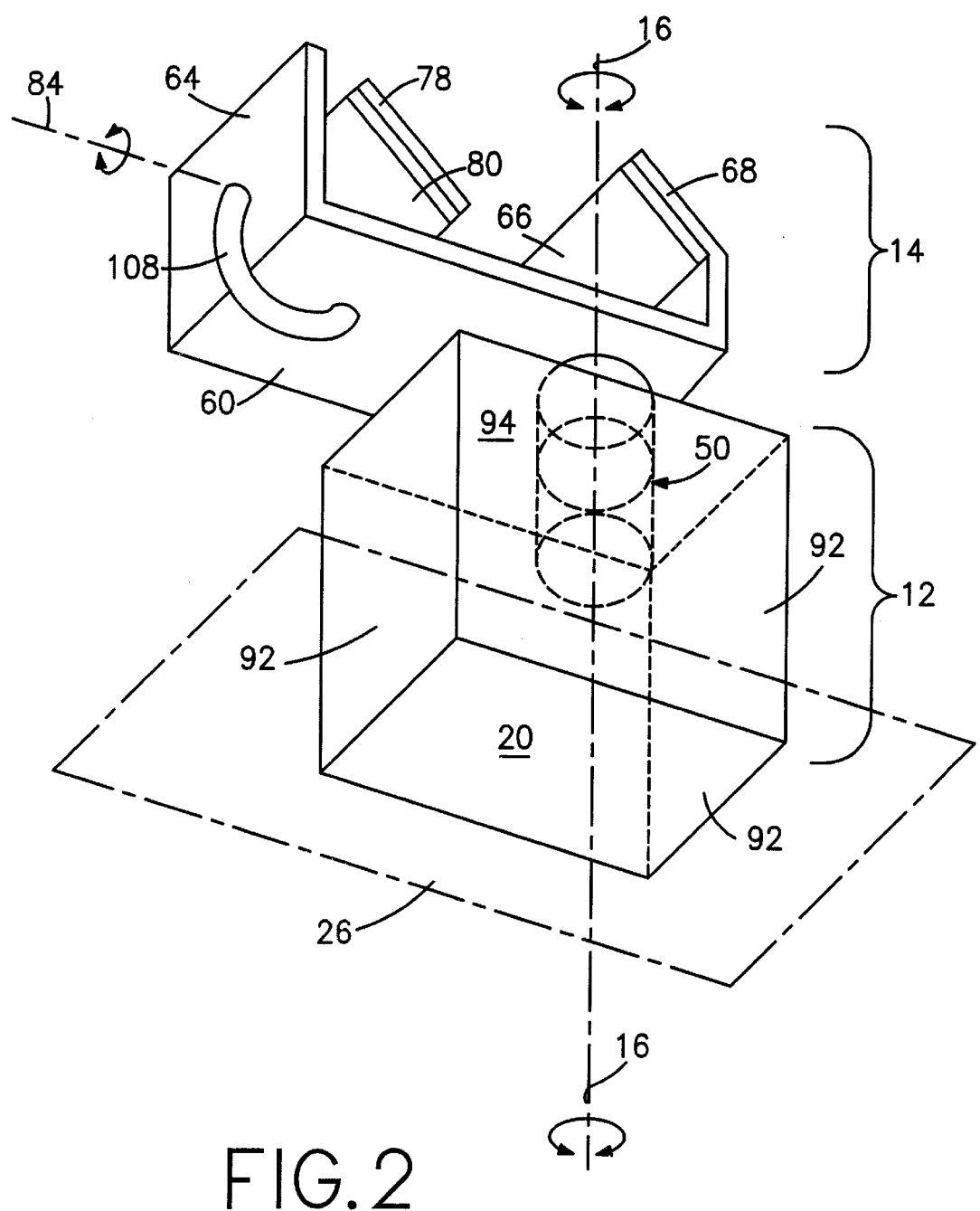
FIG. 2 is a perspective view of the low-inertial DMD stage lighting device shown in FIG. 1 inverted from the view shown in FIG. 1 with the fixed housing mounted on a surface.

FIG. 2 shows DMD light display system 10 in an inverted position relative to that shown in FIG. 1 with fixed housing 12 with wall 20 shown as a bottom wall resting upon a horizontally aligned flat surface 26 shown in phantom line such as a table or stage floor. Rotatable housing 14 is positioned directly above fixed housing 12 and is rotatable relative to fixed housing 12 about axis of rotation 16 shown in FIG. 2 as vertical and being analogous to axis of rotation 16 in FIG. 1 relative to fixed housing 12. Although the description of the invention herein is with reference to rotatable housing 14 being rotatable relative to fixed housing 12 about a vertically oriented axis of rotation 16 in accordance with FIG. 1, various alignments of axis of rotation 16 other than vertical are possible within the spirit of the invention.

Figure 3:
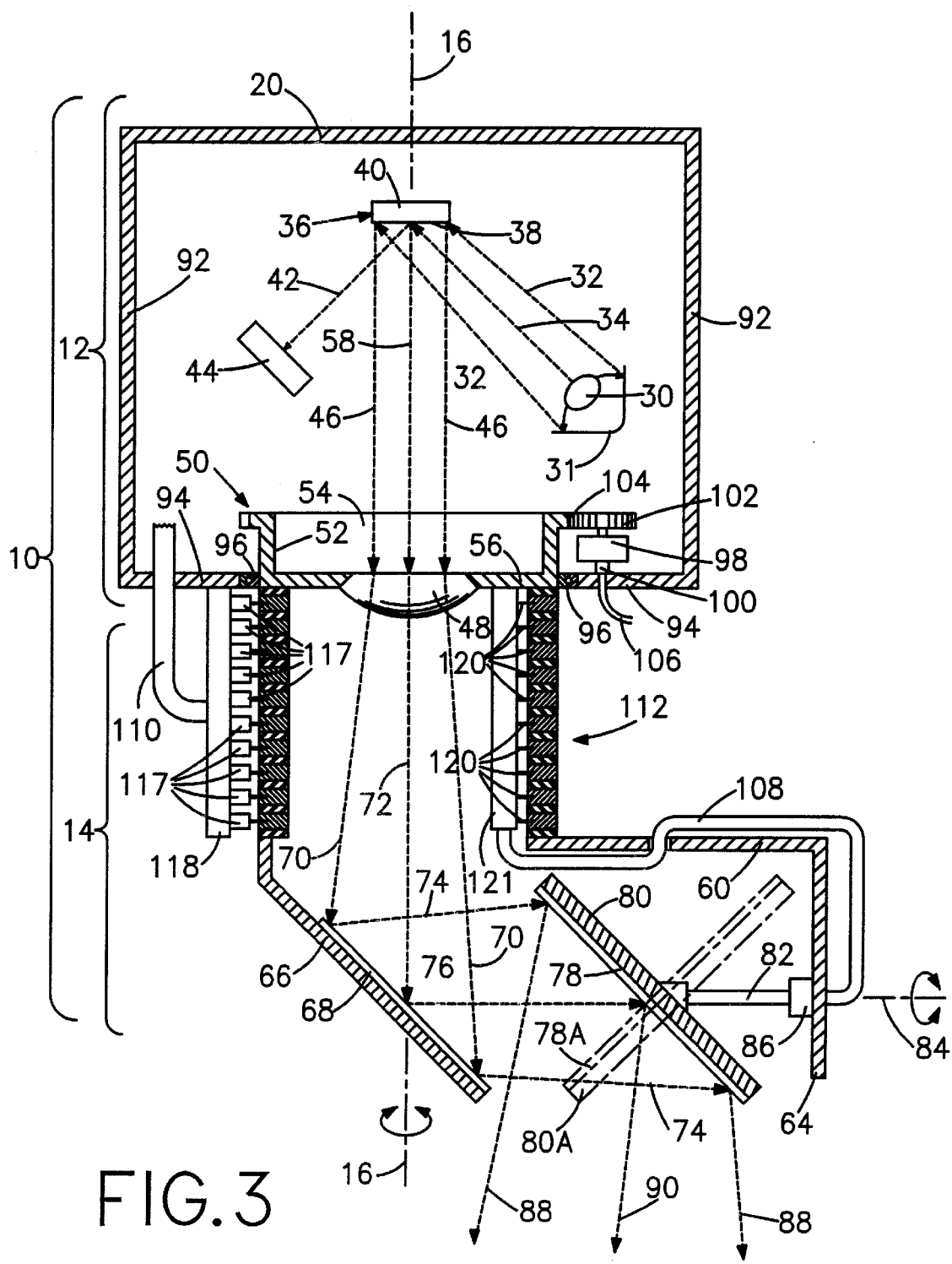
FIG. 3 is a schematic sectional side view of an embodiment of the invention mounted in the device shown in FIG. 1 with the fixed housing containing a luminaire and a DMD and having a projection lens mounted to the rotatable housing.

DMD light display system 10 is shown in a basic schematic architecture mounted in fixed housing 12 and rotatable housing 14 in FIG. 3 as based upon FIG. 1 but also applicable to FIG. 2 mutatis mutandis. A luminaire 28 comprising a lamp 30 with a reflector 31 are mounted in a manner known in the art within fixed housing 12. A light beam 32 generated by lamp 30 containing a centrally located light ray 34 is directed to a DMD 36 also mounted within fixed housing 12. DMD 36 includes a surface array 38 of a plurality of pixel mirrors, or pixels, indicated here as a single exemplary pixel mirror, or pixel, 40, which is aligned with and impinged upon by central light ray 34. All pixels 40 are bistable and rotatable between two reflecting directional positions by selective application of addressing digitized circuitry potential and addressing electrodes contained in DMD 36 that determines which way each pixel mirror 40 will rotate. The rate of rotation of each pixel mirror 40 is controlled by the digitized circuitry and addressing electrodes of DMD 36 in a manner known in the art in particular as described in the patents referred to previously and incorporated herein by reference with the result of a digitized number of rotations per unit time of each addressed plurality of pixel mirrors 40 as being of an order of time much greater that the critical frequency flicker (CFF) than the human eye as described in U.S. Pat. Nos. 5,079,544 and 5,192,946, referred to previously and incorporated by reference into the present application.

Light beam 32 impinges upon surface array 38 and is either 1) deflected therefrom in one position of each pixel 40 in one direction as a plurality of non-image forming light rays exemplified by non-image light ray 42 and deflected from pixel 40 that is directed to an opaque light stop 44 that is mounted within fixed housing 12, or 2) is reflected from surface array 38 as an image-forming digitized light beam 46 that is directed in a first optical path to a projection lens 48 mounted in rotatable housing 14.

Rotatable housing 14 includes a cylindrical mounting member 50 including a cylindrical wall 52 defining a cylindrical passage 54 having an axial center aligned with axis of rotation 16. A mounting cross-plate 56 perpendicular to axis of rotation 16 is connected to the interior of cylindrical wall 52. Projection lens 48 is mounted in an aperture at the center of mounting cross-plate 56 with projection lens 48 having a center in alignment with axis of rotation 16.

Reflected digitized light beam 46 contains a central digitized light ray 58 that is shown in FIG. 3 as being exemplary of a plurality of digitized light rays contained in digitized light beam 46 reflected from those particular pixels 40 comprising surface array 38 that have been selected for reflected activation by the addressing circuitry of DMD 36. Digitized light beam 46 selected as an image-forming light beam including central digitized light ray 58 is in general a continuation of light beam 32 and exemplary central light ray 34.

As described in U.S. Pat. Nos. 5,535,047, 5,583,688 and 5,600,383 mentioned earlier herein and other referenced patents, digitized light beam 46 is digitally activated in accordance with the process of preselected digital signals providing digital control signals to DMD 36 that digitally activates selected deformable pixel mirrors 40 to reflect digitally selected light beams such as light beam 46 in accordance with control circuitry contained in a computer that is connected to addressing circuitry contained in DMD 36. The control circuitry provides address data to the digital addressing circuitry and a plurality of address electrodes at each pixel 40 of surface array 38 of DMD 36. These digital signals provide digital control signals to each pixel mirror 40 for digitally activating selected pixel mirrors 40 to direct digitally selected light beam 46 to projection lens 48.

Rotatable housing 14 shown in FIG. 3 includes a wall plate 60 perpendicular to axis of rotation 16 connected to the bottom, or external, rim area 62 of cylindrical mounting member 50. Rotatable housing 14 further includes a side support wall 64 that is connected to the outer edge of wall plate 60 extending parallel to axis of rotation 16. A fixed mirror 66 with fixed mirror support 68 is connected to a portion of rim area 62 of cylindrical mounting member 50 at a position opposite to side support wall 64 and extending across axis of rotation 16 at a 45 degree angle relative thereto. The angle of fixed mirror 66 relative to axis of rotation 16 can vary, but for purposes of exposition a 45 degree orientation of fixed mirror 66 relative to axis of rotation 16 will be used herein. Projection lens 48 projects and expands digitized light beam 46 into cylindrical passage 54 parallel with axis of rotation 16 into a first expanding cone-shaped digitized light beam 70 having an exemplary digitized central light ray 72 in a second optical path that impinges upon fixed mirror 66. Fixed mirror 66 reflects first expanding digitized light beam 70 with its digitized central light ray 72 into a second expanding digitized light beam 74 with its second digitized central light ray 76 in a third optical path into a direction perpendicular to axis of rotation 16.

A tilt mirror 78 with rotatable mirror support 80 is mounted to rotatable housing 14 at side support wall 64 by a shaft 82 that is rotatable about an axis of rotation 84 that is perpendicular to axis of rotation 16 and in alignment with central digital light ray 76. Shaft 82 is operably and rotatably connected to a pan motor, or pan driver, 86 that acts as a tilt motor in the alignment of FIG. 3 that is secured to the inner surface of side support wall 64. Rotatable mirror 78 is rotatable over 360 degrees by tilt motor 86 in either of two rotatable directions as indicated in FIG. 3 with rotatable mirror 78 with rotatable mirror support 80 having been rotated 180 degrees to a position shown in phantom line as rotatable mirror 78A with rotatable mirror support 80A. Second expanding digitized light beam 74 with digitized central light ray 76 impinges upon rotatable mirror 78, which is shown in FIG. 3 as being in a plane oriented at 45 degrees to axis of rotation 84 and further reflects a third expanding digital light beam 88 having a central third digital fight ray 90 into a fourth optical path onto a stage display such as stage display 162 shown in FIG. 10.

Fixed housing 12 includes four opposed rectangular side walls 92 connected to rectangular wall 20 as shown in FIGS. 1, 2, and 3. Fixed housing 12 also includes a cross-plate 94 opposed to wall 20 that has an outer rectangular edge that is connected to the linear edges of side walls 92. Bearings 96 are positioned between the periphery of a circular hole defined in cross-plate 94 and cylindrical wall 52 of cylindrical mounting member 50.

A pan motor, or pan driver, 98 for rotating rotatable housing 14 relative to fixed housing 12 is connected by a bracket 100 to cross-plate 94. Pan motor 98 transmits power by a motor gear 102 to a ring gear 104 positioned around the outer surface of the upper portion of cylindrical mounting member 50. Pan motor 98 is powered by a source of electrical power by way of a bus 106. Pan motor 98 rotatably gears cylindrical mounting member 50 so that rotatable housing 14 is rotated relative to axis of rotation 16 in a selected rotatable direction.

Tilt motor 86, which is being continuously rotated along with rotatable housing 14 by pan motor 98, is electrically and operationally connected to a source of electrical power by way of a bus 108. A bus 110 connected to a source of electrical power is connected to a cylindrical slip ring connector assembly 112 that is integral with cylindrical mounting member 50 as is also shown in FIG. 6.

Figure 6:
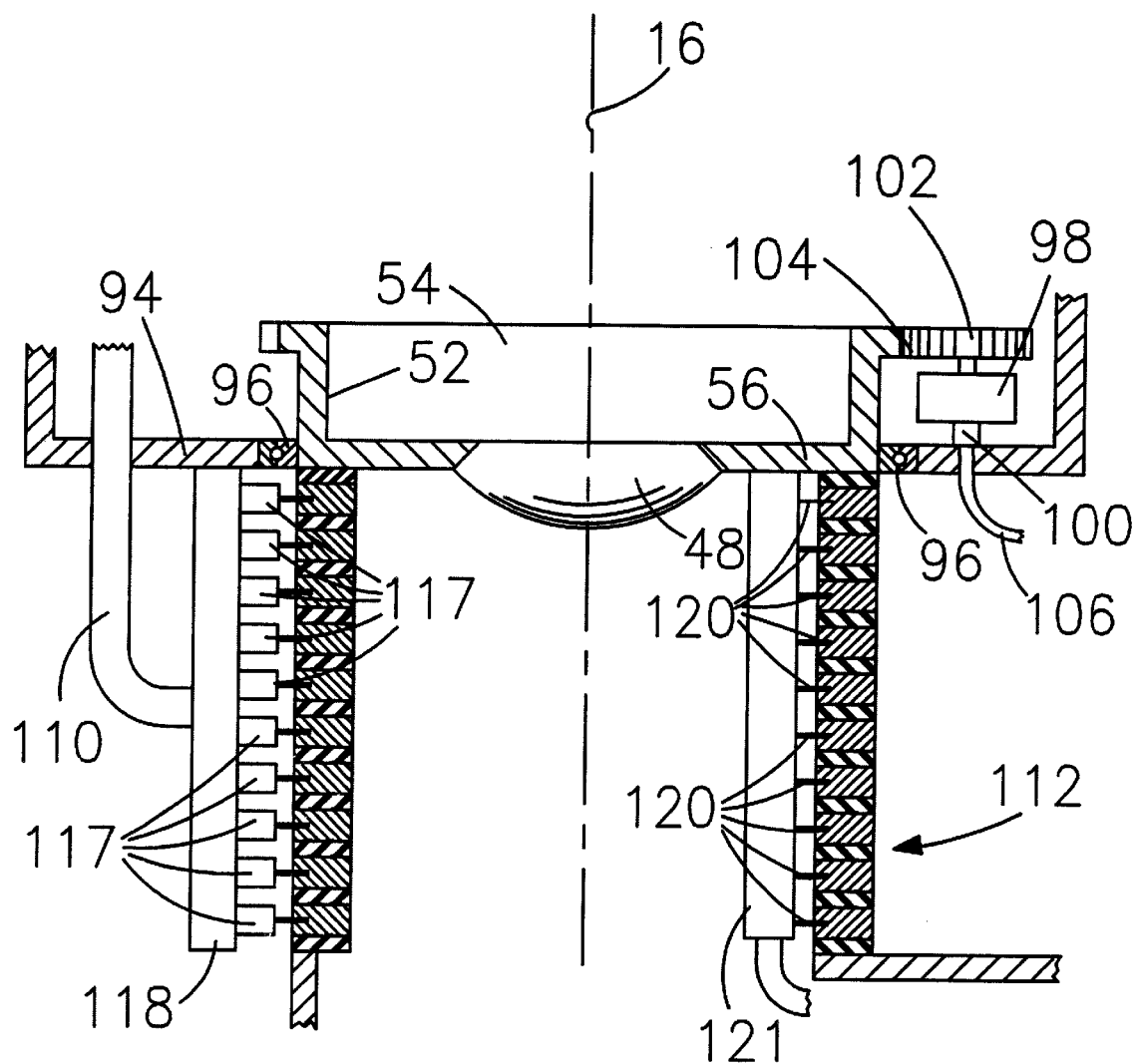
FIG. 6 is an isolated sectional view of a slip ring assembly indicated in FIGS. 3, 4, and 5 mounted in the cylindrical mounting member of the rotatable housing.

FIG. 3 and in particular FIG. 6 show details of cylindrical slip ring connector assembly 112 that includes a set of two cylindrical electrically conductive graphite rings 113 for delivering power to tilt motor 86, a set of three cylindrical electrically conductive graphite rings 114 for delivering digital electrical signals that include positive and negative electrical signals and digital signals to a sender homing device (not shown) of a type of known in the art that is built into tilt motor 86, and a set of five cylindrical electrically conductive graphite rings 115 for delivering electrical signals to an encoder (not shown) of a type known in the art that is built into tilt motor 86. Graphite rings 113, 114, and 115 are separated by cylindrical non-conductive insulators 116. Ten outer contact brushes 117 that are held by an external non-rotatable brush holder 118 are in slip electrical contact with rotatable graphite rings 113, 114, and 115. Ten outer electrical contact brushes 117 are connected to a source of electrical power and to a central processing unit (CPU) and further pass electrical power and signals to the rotatable ten electrical contact brushes 117 that are in slip electrical contact with graphite conductor rings 113, 114, and 115. Graphite conductor rings 113, 114, and 115 are isolated from one another by cylindrical nonconductive insulators 116 that extend between the inner and outer surfaces of slip-ring connector assembly 112, specifically in alignment with the inner and outer surfaces of cylindrical wall 52. Insulators 116 have diameters slightly greater than the diameters of conductor rings 113, 114, and 115 so as to define ten cylindrical recesses with conductor rings 113, 114, and 115. Ten external contact brushes 117 are positioned in cylindrical contact recesses during the rotation of cylindrical conductor rings 113, 114, and 115.

Ten electrical contacts 120 held by an internal electrical contact holder 121 are secured to and in electrical contact with cylindrical graphite electrical conductor rings 113, 114, and 115 are shown in FIG. 6 positioned in cylindrical passage 54 in such a manner so as not to interfere with first expanding light beam 70. Tilt motor 86 is thus in continuous electrical contact with the power source and a CPU even though it rotates along with its electrical contacts, namely, graphite electrical conductor Slip ring assemblies such as cylindrical slip ring assembly 112 are well-known in the art. The particular reference wherein sectioned details are shown of the type of slip-ring connector assembly 112 described herein is shown in FIG. 3 and described in detail in column 4, lines 5–41 of U.S. Pat. No. 4,729,071 mentioned previously and incorporated into the present disclosure. Another type of slip-ring connector is a flat slip-ring connector shown in FIG. 11 and described in column 9, lines 23–48 in U.S. Pat. No. 4,729,071 which can be adapted for a slip-ring connector for the present application and is incorporated herein.

Operation of tilt motor 86 rotates rotatable mirror 78 about axis of rotation 84 as indicated in FIG. 3 in a 90 degree rotational position in phantom line indicated as rotatable mirror 78A with mirror support 80A. Pan motor 98 and tilt motor 86 are operable either individually or simultaneously. Final third expanding digital light beam 88 is directed in a cone-shaped configuration around axis of rotation 84 that is directed by signals from a CPU onto a stage display 162 in FIG. 10. Central digital light ray 90 contained in isolation within third expanding digital light beam 88 is rotatable so as to define a plane perpendicular to axis of rotation 84 and lateral to axis of rotation 16. Third expanding digital light beam 88 including central digital light ray 90 is digitally selected by combined signals from a CPU directed to both tilt motor 86 and to pan motor 98 in a manner described in relation to light display system 10. Third digital light beam 88 is directed at a stage display such as stage rear wall 162 shown in FIG. 10.

Operation of tilt motor 86 rotates rotatable mirror 78 with mirror support 80 from its initial position about axis of rotation 84 as indicated to a position of mirror 78A with mirror support 80A shown rotated over 90 degrees as in shown in phantom line. The actual direction of digitized light beam 88 with central light ray 90 varies from being perpendicular to axis of rotation 84 depending upon the rotated position of rotatable mirror 78. Digitized light beam 88 is rotatable over 360 degrees in a position lateral to axis of rotation 16. Pan motor 98 and tilt motor 86 are operable either individually or simultaneously.

Figure 4:
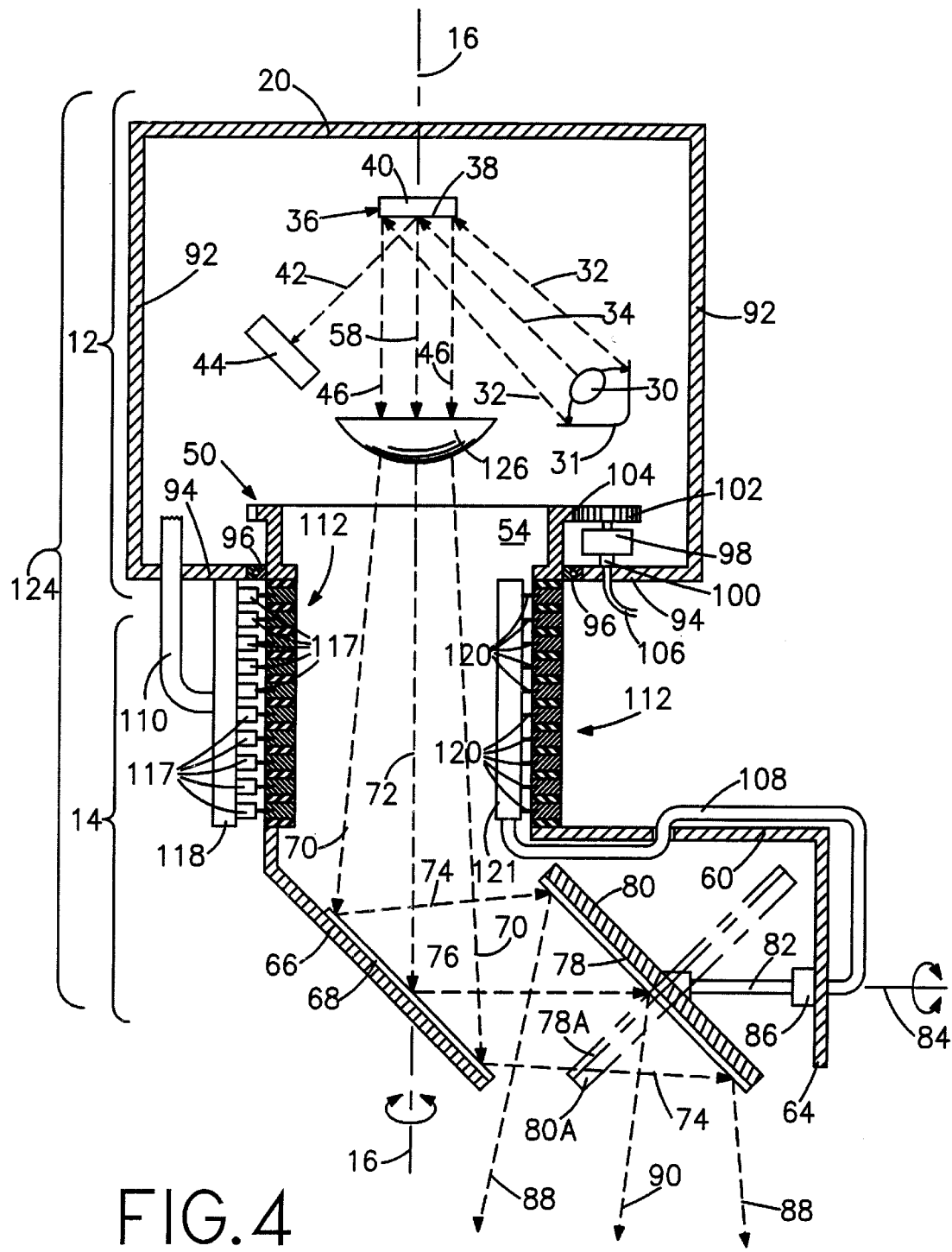
in FIG. 4 is a schematic sectional side view of an alternative embodiment of the invention mounted in the device shown in FIG. 1 having a projection lens mounted to the fixed housing.

A DMD light display system 124 analogous to DMD light display system 10 is shown in FIG. 4 mounted in fixed housing 12 and rotatable housing 14 analogous to that shown in FIG. 3 with the same reference numerals being shown for identical or similar parts. DMD light display system 124 includes a projection lens 126 analogous to projection lens 48 that is mounted within fixed housing 12 in a manner known in the art so that when rotatable housing 14 is rotated, projection lens 126 remains immobile. In all other respects, light display system 124 is directly analogous in structure and in operation to light display 10 with the same numerals for identical or similar parts being shown.

Figure 5:
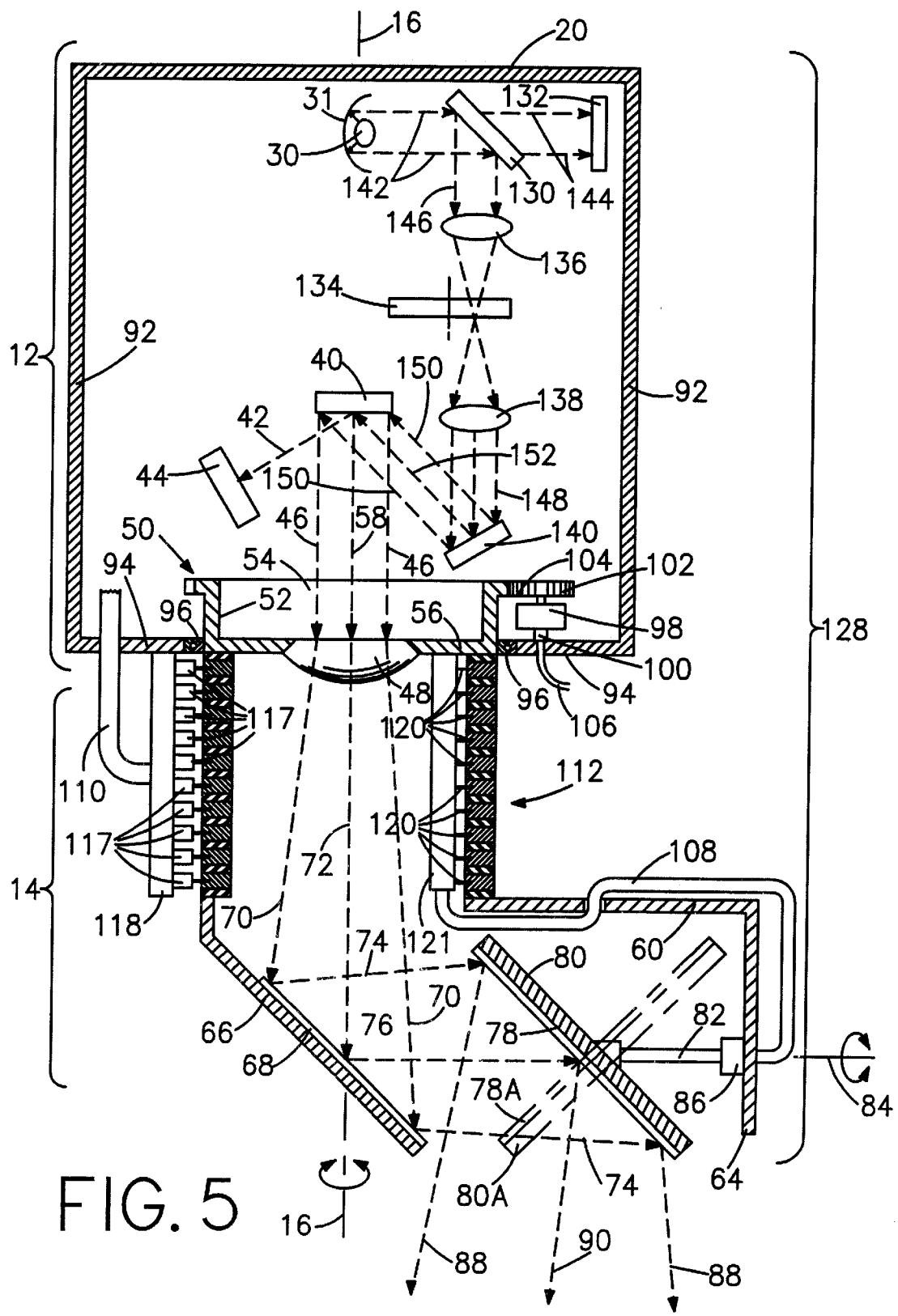
FIG. 5 is a schematic sectional side view of an embodiment of the present invention analogous to that shown in FIG. 3 further including a color wheel, a cold mirror with a heat sink, and a fold mirror.

A DMD light display system 128 shown in FIG. 5 includes a fixed housing 12 and a rotatable housing 14 analogous to DMD light display system 10 with the same reference numerals being shown for identical or similar parts. A cold mirror 130 along with a heat sink 132 are positioned near lamp 30 and reflector 31 with a color wheel 134 being positioned between a pair of focus lenses 136 and 138 near a fold mirror 140.

A light beam 142 generated by lamp 30 is directed at cold mirror 130, which reflects light beam 142 to cold mirror 130 which passes non-visible light spectrum rays 144 to heat sink 132. Cold mirror 130 reflects a light beam 146 to focus lens 136 through color wheel 134 and through focus lens 138 as a colored light beam 148 to fold mirror 140 from where a reflected colored light beam 150 containing central light ray 152 is directed to DMD 36. Pixels 40 reflect non-imaged digital light rays 42 to a light stop 44. Pan motor 98 is secured by a bracket 100 to cross-plate 94 of fixed housing 12.

Operation of tilt motor 86 rotates rotatable mirror 78 with rotatable mirror support 80 from its initial position about axis of rotation 16 as indicated over 90 degrees as shown with rotatable mirror 78A with mirror support 80A in phantom line. The actual direction of third digitized light beam 88 with central light ray 90 varies from being perpendicular to axis of rotation 84 depending upon the rotated position of rotatable mirror 78 and is rotatable over 360 degrees lateral to axis of rotation 16. Pan motor 98 and tilt motor 86 are operable either individually or simultaneously.

Figure 7A:
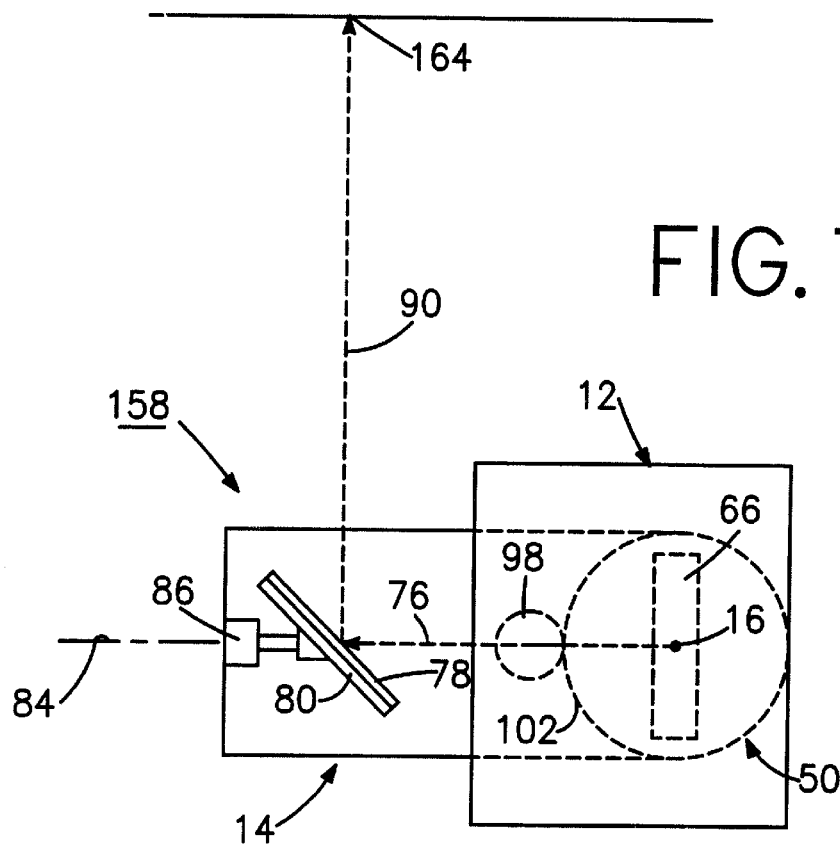
FIG. 7A is a simplified schematic top view of low-inertial stage lighting device having for purposes of exposition a single central light ray emanating from the fixed mirror of the rotatable housing to the rotatable mirror of the rotatable housing in turn being reflected to a first impingement on the rear vertical wall of a stage.

FIGS. 7A, 7B, 8 and 9 show top views of a DMD light display system 158 analogous in detail to DMD light display systems 10 and 128 with the same reference numerals being shown for identical or similar parts and that includes a fixed housing 12 and a rotatable housing 14 rotatably attached to fixed housing 12. Rotatable housing 14 along with fixed mirror 66 connected to rotatable housing 14 is shown being rotated about axis of rotation 84 from a first position in FIG. 7A to a second position shown in FIG. 7B by counterclockwise motion of pan motor 98 rotating rotatable housing 14 together with cylindrical mounting member 50 clockwise about vertical axis of rotation 16. In the particular exemplary alignment of DMD light display system 158 shown in FIGS. 7A, 7B, 8, and 9, axis of rotation 16 is shown as being vertical and axis of rotation 84 is shown as being horizontal. The views shown in the figures are merely for purposes of exposition, and it is possible that axis of rotation 16 and axis of rotation 84 can be positioned in other alignments than vertical and horizontal. It is further noted that the relative vertical and horizontal relationship of 90 degrees between axis of rotation 16 and axis of rotation 84 shown in the figures can vary from 90 degrees to other angled relationships. In the particular exemplary alignment of DMD light display system 158 of FIGS. 7A and 7B, a DMD selected first central light beam (not shown) including a first central light ray (not shown) analogous to first expanding digitized light beam 70 and central light ray 72 emanates vertically downwardly from a luminaire and a projection lens analogous to the luminaire system and projection lenses shown in DMD light display systems 10 and 128 through cylindrical mounting member 50. Fixed mirror 66 in both FIGS. 7A and 7B reflects the downward vertical DMD light beam and light ray as a digitally selected second light beam exemplified by central second central light ray 76 so as to impinge upon rotatable mirror 78. Fixed mirror 66 remains immobile during an exemplary rotational movement of rotatable housing 14 from a first position shown in FIG. 7A and a second rotated position shown in FIG. 7B for purposes of exposition. In FIG. 7A a digitally selected light beam 88 reflected from rotatable mirror 78 includes an exemplary digital third central light ray 90 that follows a light ray path to a stage 160 impinging upon a stage display exemplified by a rear vertical stage wall 162 shown in FIG. 10 as a digitally selected first point of light 164. The alignment of rotatable mirror 78 is in an alignment rotated slightly away from the vertical viewed clockwise from the external side of tilt motor 86 in order to achieve the slightly downwardly non-horizontal plane of the path of exemplary light ray 90 shown in FIGS. 7A and 7B. The path of light ray 90 in FIGS.

Figure 7B:
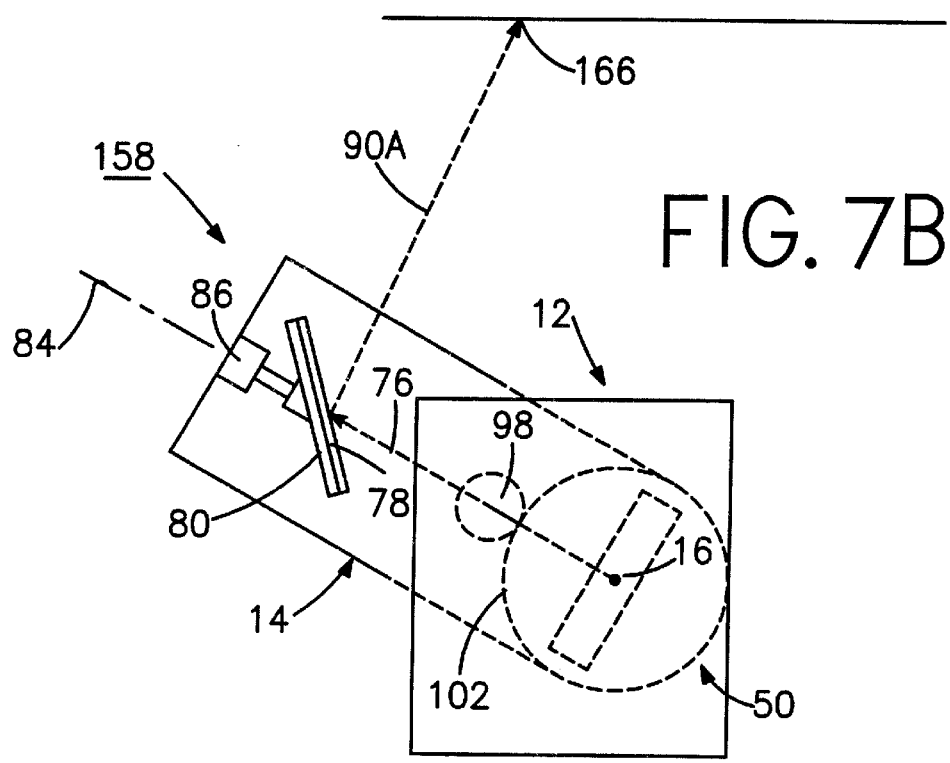
FIG. 7B is a top view of the stage lighting device as shown in FIG. 7A with only the rotatable housing having been rotated to a new position so that the central light ray shown in FIG. 7A has been shifted horizontally to a second impingement on the rear vertical wall of the stage.

7A and 7B could also be horizontal to demonstrate the operational result of the rotation of rotatable housing 14 while rotatable mirror 78 remains in a non-rotational mode. In FIG. 7B in the rotated second position of rotatable housing 14, exemplary third central light ray 90 strikes stage wall 162 at a digitally selected second point of light 166 horizontal relative to first point of light 164. During the rotational movement of rotatable housing 14, continuous digitally selected points of light created by exemplary light ray 90 emanating from rotatable mirror 78, which is not in a rotating mode, exemplified by light ray 90, move linearly and horizontally as light ray 90 impinges upon stage wall 162 from first point of light 164 to second point of light 166. The exemplary operation of DMD light display system 158 when rotatable mirror 78 is in a non-rotating mode shown in FIGS. 7A and 7B can vary wherein the path of exemplary central light ray 90 between rotatable mirror 78 and stage wall 162 can follow any of a plurality of planes as long as the exemplary plurality of linear impingements on stage wall 162 between first point of light 164 and second point of light 166 is horizontal.

Figure 8:
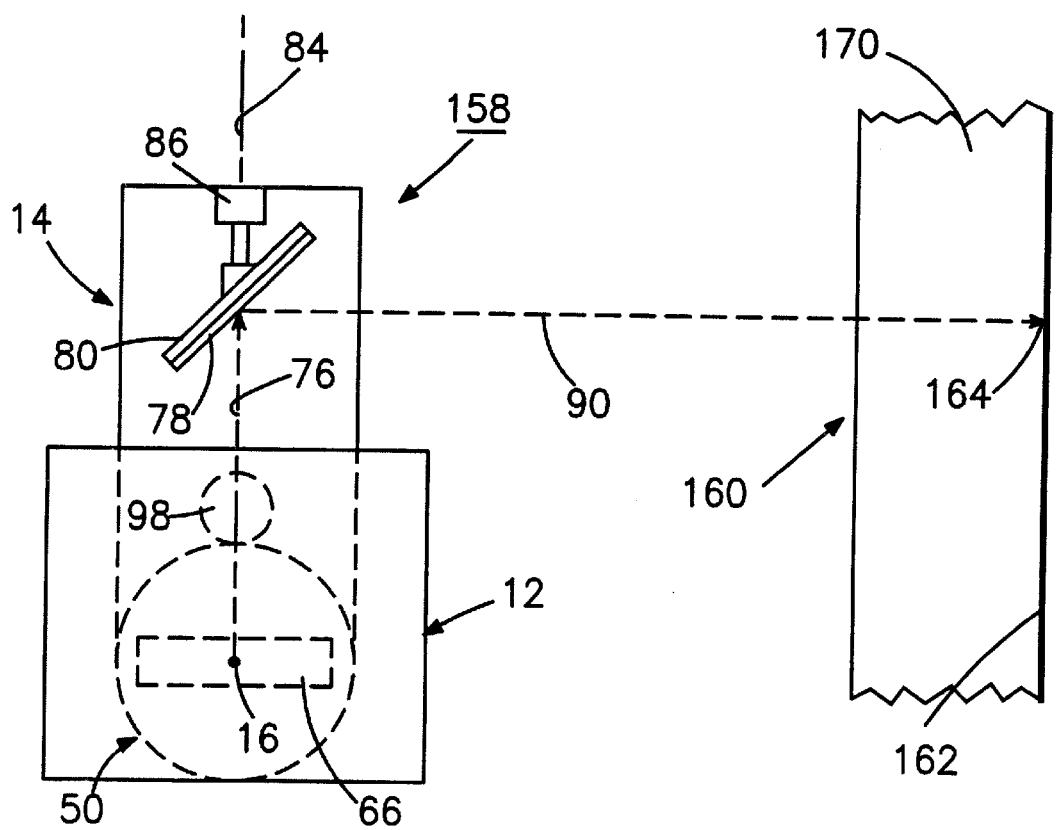
FIG. 8 is a top view of the stage lighting device as shown in FIG. 7A with a central light ray being reflected from the fixed mirror to the rotatable mirror and further reflected to a first impingement on the rear wall of the stage.
Figure 8A:
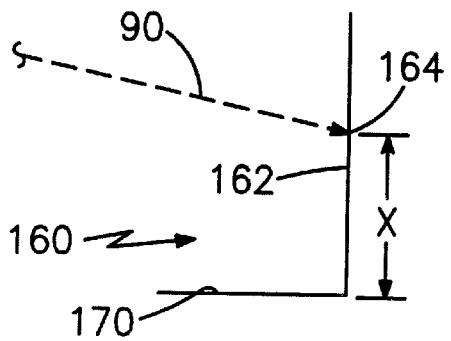
FIG. 8A is an isolated side view of the stage shown in FIG. 8 showing the central light ray shown in FIG. 8 impinging upon the vertical rear wall of the stage at a first height coincident with the impingement of the central light ray shown in FIG. 7A.
Figure 9:
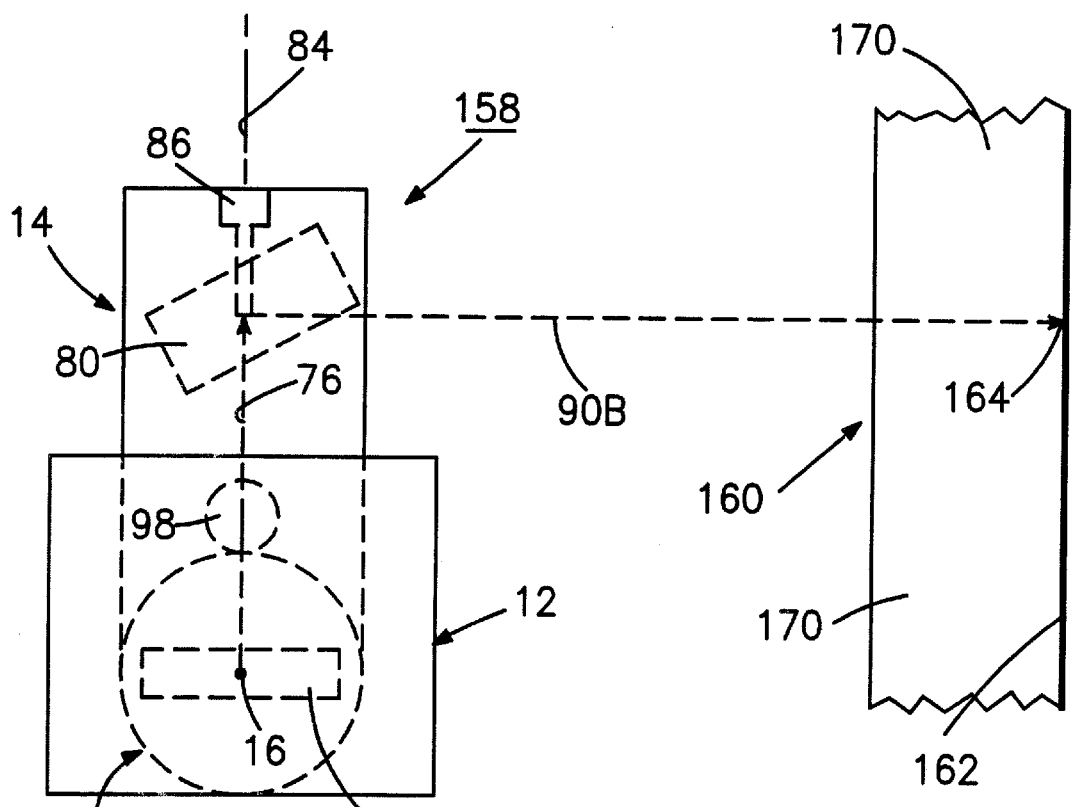
FIG. 9 is a top view of the stage lighting device as shown in FIG. 8 with only the rotatable mirror having been rotated so the path of the central light ray impinges on the rear vertical wall of the stage at a second height.
Figure 9A:
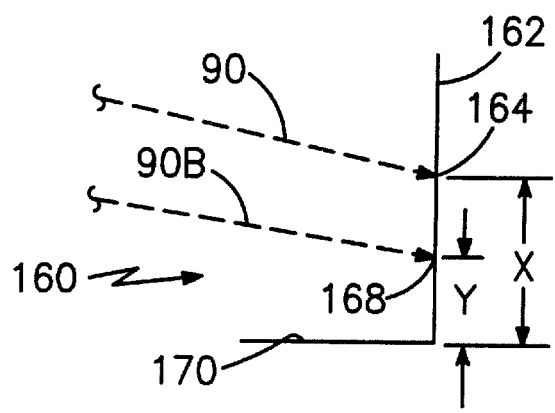
FIG. 9A is an isolated side view of the stage shown in FIG. 9 showing the light ray striking the vertical rear wall at the second height shown to be lower than the first height.

FIGS. 8 and 9 show the same top view of DMD display system 158 as shown in FIGS. 7A and 7B. The initial positions of rotatable housing 14 and rotatable mirror 78 are the same in FIGS. 7A and FIG. 8. Rotatable mirror 78 is shown in FIG. 9 having been rotated by tilt motor 86 from a first position in FIG. 8 vertically downward to a second position shown in FIG. 9. During the rotary motion of rotatable mirror 78, rotatable housing 14 remains immobile in the particular views shown in FIGS. 8 and 9 for purposes of exposition. A digitally selected light beam containing an exemplary digitally selected first central light ray emanating vertically downward from the luminaire system and projection lens shown and described in relation to DMD light display systems 10 and 128 impinges upon fixed mirror 66 in both FIGS. 8 and 9 and is reflected therefrom as second central digitized light ray 76 to impinge upon and be reflected from rotatable mirror 78 as third central light ray 90 in FIGS. 8 and 8A and as third central light ray 90B in FIGS. 9 and 9A. Third central light ray 90 contained in a digitally selected light beam that follows a light path to stage 160 and thereupon strikes upon rear vertical stage wall 162 as a first point of light 164, which is the same impingement as shown in FIG. 7A. Rotatable tilt mirror 78 is capable of a 360 degree rotation such that reflected third central light ray 90 defines a theoretical 360 degree vertical plane. During such a 360 degree rotation third central light ray 90 would at a certain angles impinge upon the structure of rotatable housing 14, primarily mounting cross-plate 56. As shown in FIG. 8A and 9A, first point of light 164 impinges upon stage wall 162 at a vertical distance, or height, X above stage floor 170. The exact distance of height X is dependent upon the original angle of the tilt of rotatable mirror 78 and the vertical distance of placement of DMD light display system 158 relative to stage wall 162. Light ray 90B shown in FIGS. 9 and 9B impinging upon stage wall 162 at a second point of light 168 that is at a vertical distance Y above stage floor 170. The rotation of rotatable mirror 78 from the position in FIG. 8 is counterclockwise relative to a position at axis of rotation 84 behind tilt motor 86 which results in causing third light ray 90 to strike stage wall 162 at second point of light 168 such that distance Y is less than distance X. The exemplary placement of DMD light display system 158 with axis of rotation 16 being vertical and axis of rotation 84 being horizontal as shown in FIGS. 8, 8A, 9, and 9A can vary so that the paths of light ray 90 to light ray 90B can follow a non-vertical plane.

Figure 10:
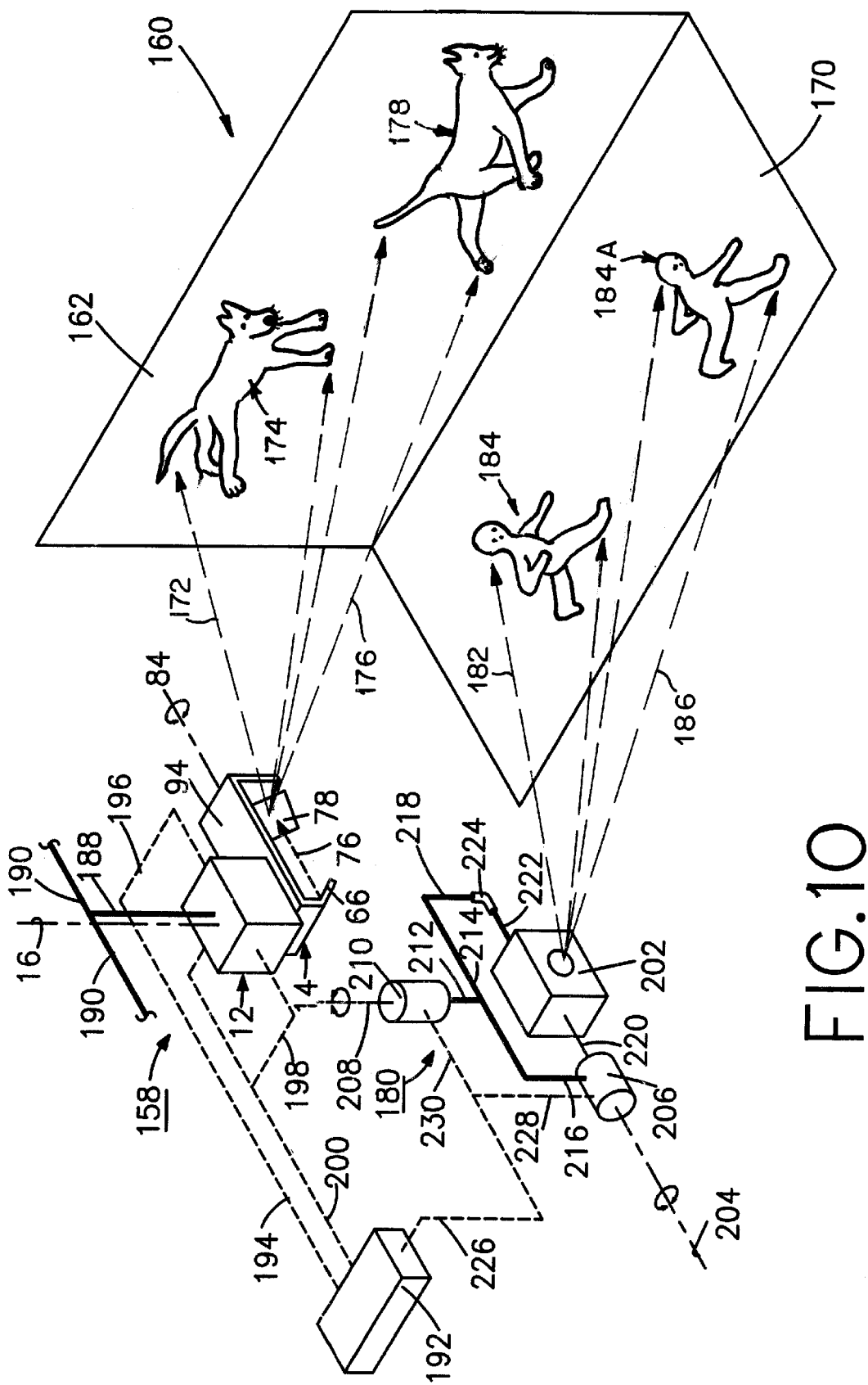
FIG. 10 is a schematic perspective view of an embodiment of the present invention showing the operation of projecting a moving image onto a stage display and further being used in unison with a standard spotlight projection system illuminating a stage performer.

FIG. 10 shows DMD light display system 158 shown in FIGS. 7A–9A, which in turn is analogous to DMD light display systems 10 and 128. DMD light display system 158 is shown projecting upon stage vertical rear wall 162 of stage 160 a continuous digitally selected series of a plurality of light points represented by a digitally selected first light beam 172 that defines a first image 174 of a running cat at stage left and a digitally selected second light beam 176 that defines a second image 178 of the running cat at stage right. A plurality of digitally selected light beams that project images of the moving cat between first and second images 174 and 178 are implied in FIG. 10.

DMD light display system 158 is shown in FIG. 10 being used in conjunction with a stage spotlight system 180 that projects a first light beam 182 that illuminates and follows a live stage performer 184 on stage floor 170 at stage left across stage 160 to stage right where performer 184 is illuminated at a second position indicated as 184A shown as a second light beam 186. Performer 184 is continuously illuminated by stage spotlight system 180 during the movement from stage left to stage right. Stage spotlight system 180 is one that is known in the art of stage illumination.

DMD light display system 158 includes a vertical rod 188 secured to top wall 20 of fixed housing 12 and attached by means known in the art to a horizontal bar 190 that in turn is connected to fixed supports. Both rotatable housing 14 with fixed mirror 66 being rotated by pan motor 98 about vertical axis of rotation 16 and rotatable tilt mirror 78 being rotated by tilt motor 86 about horizontal axis of rotation 84 cooperate with one another in mutually coordinated movements in the DMD light display system 158 in FIGS. 7A, 7B, 8, and 9 to generate the digitally selected moving image of a running cat moving from first image 174 to second image 178.

In order to project digital light beam 172 to define first image 174 at the generally raised position at stage left as shown in FIG. 10 and thereupon to project digital light beam 176 at the generally lowered position at stage right to define second image 178 at the somewhat lowered position at stage right as shown in FIG. 10, rotatable housing 14 is rotated clockwise as shown in FIGS. 7A and 7B and in addition rotatable mirror 78 is rotated counterclockwise to the general position shown in FIGS. 8 and 9 in the manner described. Digital light beam 172 is analogous to third light ray 90 shown in FIGS. 7A and 8. The continuous movements of rotatable housing 14 and rotatable mirror 78 is coordinated with the images selected by DMD 36 as shown in DMD light display systems 10 and 128 that defines a plurality of digital images of the cat image between first and second cat images 174 and 178 create the illusion to the human eye of a moving image running across much of the width and height of rear stage wall 162.

Figure 11:
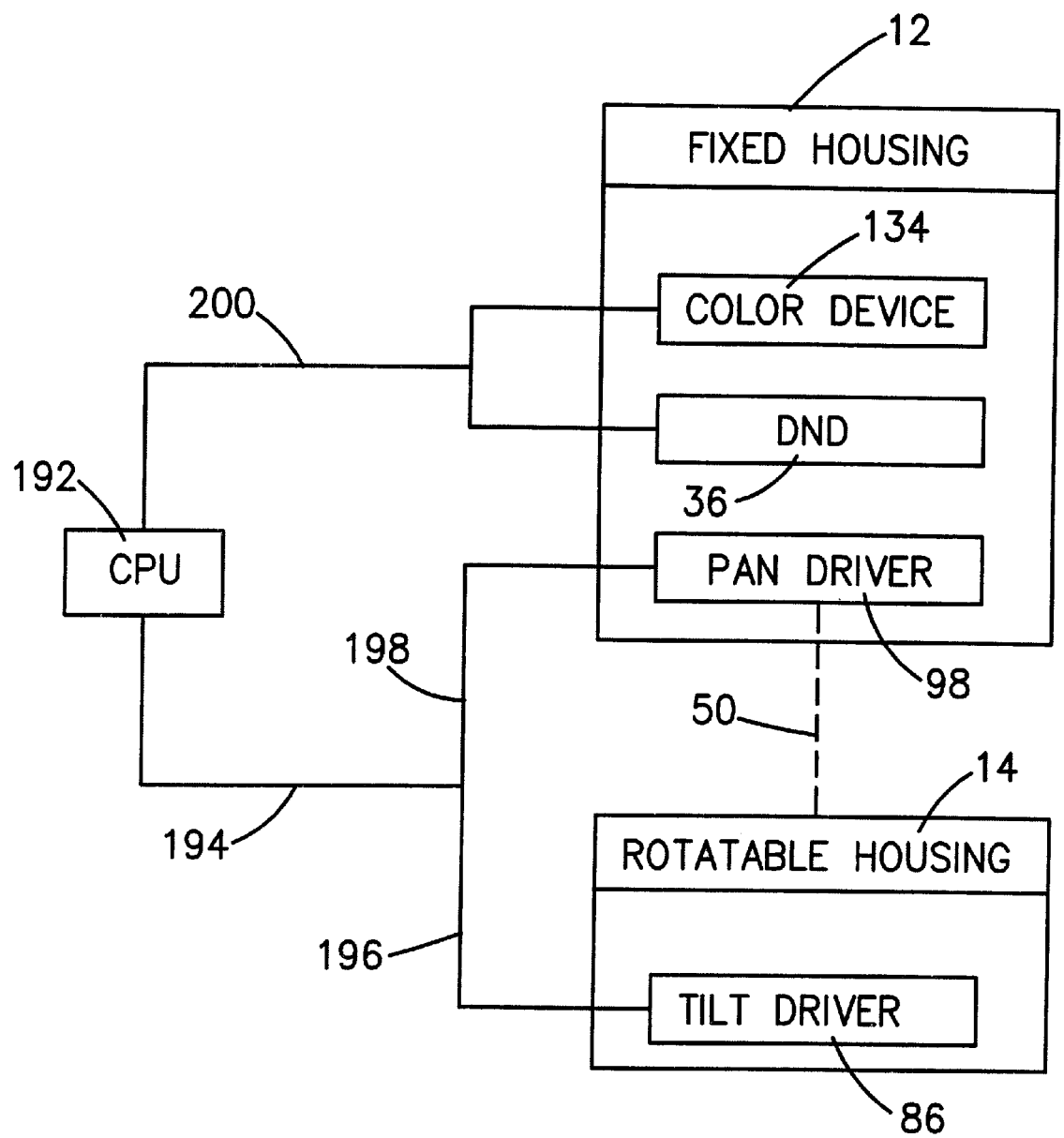
FIG. 11 is a block logic diagram of basic control elements of the present invention.

Pan motor 98 mounted in fixed housing 12, tilt motor 86 mounted in rotatable housing 14, and DMD 36 mounted in fixed housing 12 are controlled by signals sent by a central processing unit (CPU) 192 as shown in FIG. 10 and FIG. 11.

CPU 192, which is connected to a source of electrical power, is programmed to send three sets of signals to DMD light display system 158 as follows: a bus 194 to a first signal circuit path 196 to tilt motor 86; and bus 194 to a second signal circuit path 198 to pan motor 98 via slip ring connector assembly 112 as shown in and described in relation to FIG. 6; and a third signal path 200 to DMD 36 and color wheel device 134 as set forth in FIG. 10.

Stage spotlight system 180 includes a spotlight housing 202 of a type known in the art of stage lighting containing a luminaire and a projection lens (not shown). Spotlight housing 202 is rotatable about an X-axis 204 by an X-axis tilt motor 206 and rotatable about a Y-axis 208 and a Y-axis pan motor 210. Spotlight housing 202 is supported by a vertical bar 212 connected at its lower end to a horizontal bar 214 that in turn is connected at its ends to a pair of vertical supports 216 and 218. Vertical support 214 is connected to X-axis motor 206 that in turn is horizontally rotatably connected to one side of spotlight housing 202 by horizontal rod 220 and to vertical support 218. A horizontal rod 222 is connected at the opposite side of spotlight housing 202 to a connector 224 that is connected to vertical support 214 and that allows X-axis rotation about horizontal rod 222. Vertical support 218 is horizontally connected to the opposite side of spotlight housing 202. Y-axis motor 210 is secured to a fixed support (not shown). Tilting of spotlight housing 202 about X-axis 204 by rotation of X-axis tilt motor 206 results in a vertical movement of the spotlight beam. Panning of spotlight housing 202 about Y-axis 208 by Y-axis motor 210 results in a horizontal movement of the spotlight beam. For purposes of exposition first spotlight beam 182 is shown emanating from spotlight housing 202 illuminating stage performer 184 at stage left and second spotlight beam 186 is shown emanating from spotlight housing 202 illuminating the same stage performer 184A at stage right. As stage performer 184 is moving from the first position at stage left to the second position 184A at stage right, the movement of spotlight housing 202 is controlled so that first spotlight beam 182 is moved to second spotlight beam 186 so as to continuously illuminate with a spotlight beam the position of stage performer 184 at stage left through all locations to the position of stage actor 184A at stage right.

Spotlight tilt motor 206 and spotlight pan motor 210 are controlled by signals sent by CPU 192. A spotlight bus 226 connected to CPU 192 sends two sets of signals to spotlight housing 202 as follows: a first signal circuit 228 to X-axis tilt motor 206; and a second signal circuit 230 to Y-axis pan motor 210. The control signals from CPU 192 coordinate the both the panning and tilting movements of spotlight housing 202. The control signals are programmed into CPU 192 so that spotlight housing 202 moves in accordance with the programmed instructions and stage performer 184 moves in rehearsed movements that anticipate positions of the spotlight beam. Alternatively, spotlight housing 202 can be hand controlled to follow stage performer 184 about stage 160.

In CPU 192 can be programmed to synchronize all the functions associated with both DMD light display system 128 and stage spotlight system 180.

FIG. 11 details the functions of DMD light display system 158 in a programmed signal connection with CPU 192. Bus 194 is in signal circuit connection with CPU 192 and with first signal circuit 196 to pan motor 98 and with second signal circuit 198 to tilt motor 86. CPU 192 is also in signal connection with DMD 36 and a color device such as color wheel 134 shown in FIG. 5 by a bus 200 and a first signal circuit signal circuit 228. Pan driver 98 drives rotatable housing 14 by way of being geared to cylindrical mounting member 50 indicated by dashed line between pan driver 98 and rotatable housing 14. CPU 192 can be programmed to synchronize all the functions associated with both fixed housing 12 and rotatable housing 14. CPU 192 also can be programmed to centralize or decentralize control of the functions of fixed housing 12 and rotatable housing 14 and stage spotlight system 180 shown in FIG. 10.

Figure 12:
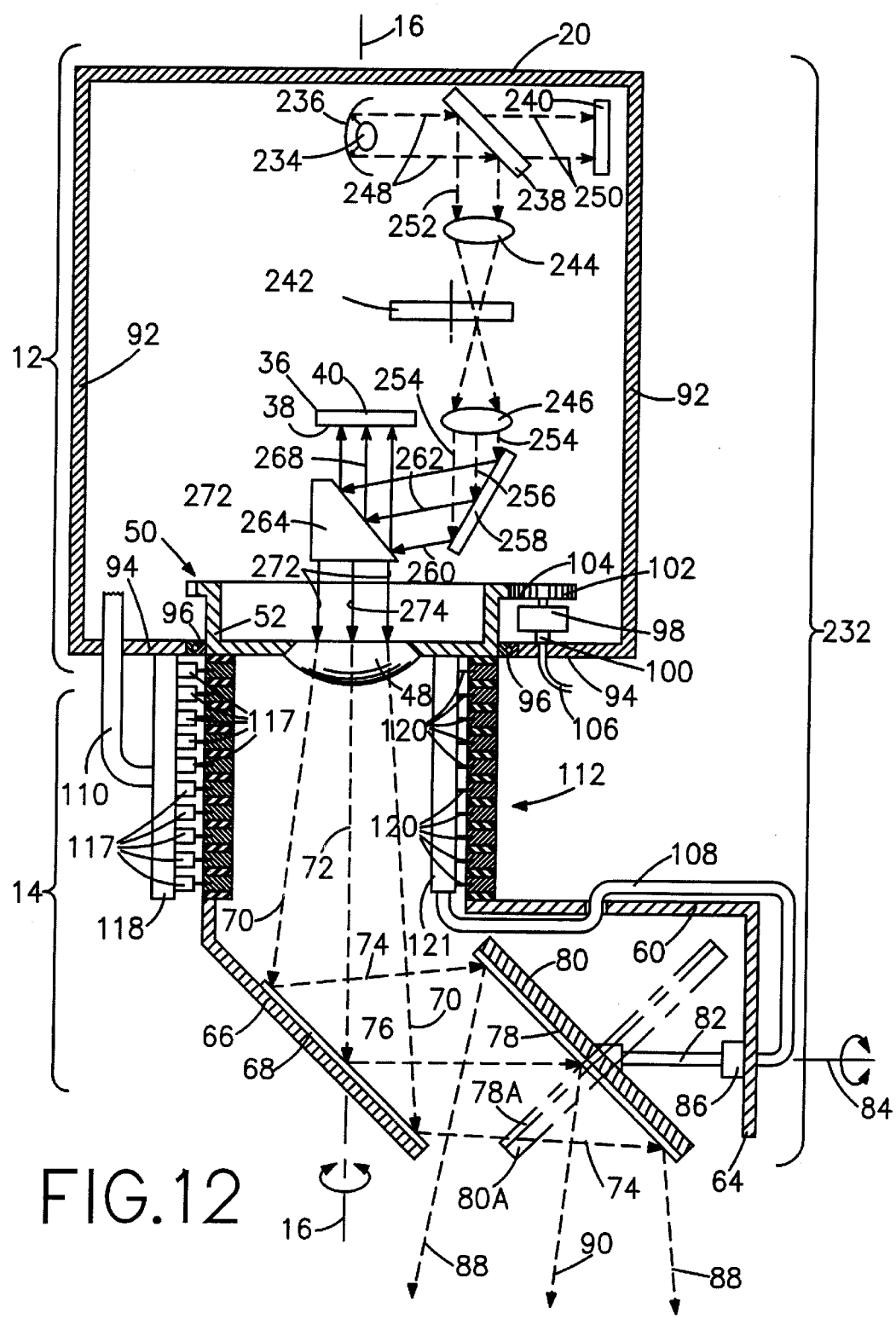
FIG. 12 is a schematic sectional side view of an in embodiment of the present invention that includes a color wheel and a single Total Internal Reflection (TIR) prism and single DMD chip and a cold mirror with a heat sink mounted and a fold mirror in the fixed housing.

A DMD light display system 232 shown in FIG. 12 includes a fixed housing 12 and a rotatable housing 14 is analogous to DMD light display systems 10 and 158 with the same reference numerals being shown for identical or similar parts. A luminaire mounted in fixed housing 12 comprises a lamp 234 with a reflector 236, a cold mirror 238, a heat sink 240, a color wheel 242 positioned between a pair of focus lenses 244 and 246.

A first light beam 248 generated by lamp 234 that is directed at cold mirror 238 that passes light rays 250 of certain wave lengths of the non-visible spectrum to heat sink 240 and reflects a second light beam 252 of the visible spectrum to focus lens 244, color wheel 242, and focus lens 246 and thereupon as a third light beam 254 with an exemplary central light ray 256 to a fold mirror 258 that shortens the length of the light beams in fixed housing 12 and so reduces the size of fixed housing 12 in manner known in the art. Fold mirror 258 reflects a fourth light beam 260 containing an exemplary central light ray 262 to a Total Internal Reflecting (TIR) prism 264 that is in close proximity to DMD 36 analogous to DMD 36 shown in DMD light display systems 10, 128, and 158 that includes surface array 38 of a plurality of pixel mirrors, or pixels, indicated as a single exemplary pixel mirror 40. A fifth light beam 266 containing an exemplary central light ray 268 is reflected from TIR prism 264 to pixel mirrors 40 and a digitally selected light beam 270 in a first optical path analogous to digitized light beam 46 of FIG. 3 with an exemplary light ray 272 is reflected from DMD 36 and exemplary pixel mirrors 40. Interference between light beams reflected from TIR prism 264 and digital light beams reflected from DMD 36 is avoided by means known in the art.

Light from TIR prism 264 to pixel mirrors 40 is either 1) deflected from pixel mirrors 40 in one direction as a plurality of non-image forming light rays (not shown) to an opaque light stop (not shown) that is mounted within fixed housing 12, or 2) is reflected from pixel mirrors 40 as reflected image-forming digitized light beam 270 including central digital light ray 272 at an angle that is directed in a manner known in the art through a projection lens 48 mounted in a cylindrical mounting member 50.

In the same manner as previously described for DMD light display system 10 and DMD light display system 128, digitized beam 270 continues from projection lens 48 as a first expanding cone-shaped digitized light beam 70 including exemplary digitized central light ray 72 to fixed mirror 66 which reflects a second expanding cone-shaped digitized light beam 74 including exemplary second digitized central light ray 76 along axis of rotation 84 to rotatable mirror 78 which reflects a third expanding cone-shaped light beam 88 including exemplary central digitized light ray 90 directed perpendicular to axis of rotation 84 to a stage display such as stage rear wall 162 shown in FIG. 10.

Operation of tilt motor 86 rotates rotatable mirror 78 with mirror support 80 from its initial position about axis of rotation 84 as indicated to a position of mirror 78A with mirror support 80A over 90 degrees as shown in phantom line. The actual direction of digitized light beam 88 with central light ray 90 varies from being perpendicular to axis of rotation 84 depending upon the rotated position of rotatable mirror 78. Digital light beam 88 with central light ray are rotatable over 360 degrees lateral to axis of rotation 16. Pan motor 98 and tilt motor 86 are operable either in individually or simultaneously.

The architecture of DMD light display system 232 particularly as described mounted in fixed housing 12 is set forth in an article entitled "Display System Architectures for Digital Micromirror Device (DMD) Based Projectors", by James M. Florence and Lars A. Yoder, published July, 1996, Proc. SPIE, Vol. 2650, pp. 193–208. In particular, this particular architecture is described in a sub-heading entitled "1-DMD System Architecture" on pages 198–200. The advantage of the one-DMD architecture is described therein as being particularly efficient when the color wheel, such as color wheel 242 is shifted out of the optical path when a monochromatic mode of operation can triple the light output. The 1-DMD system architecture in described on page 202 of the referenced article as being a low-cost/performance system. This article is incorporated by reference into the present application.

Figure 13:
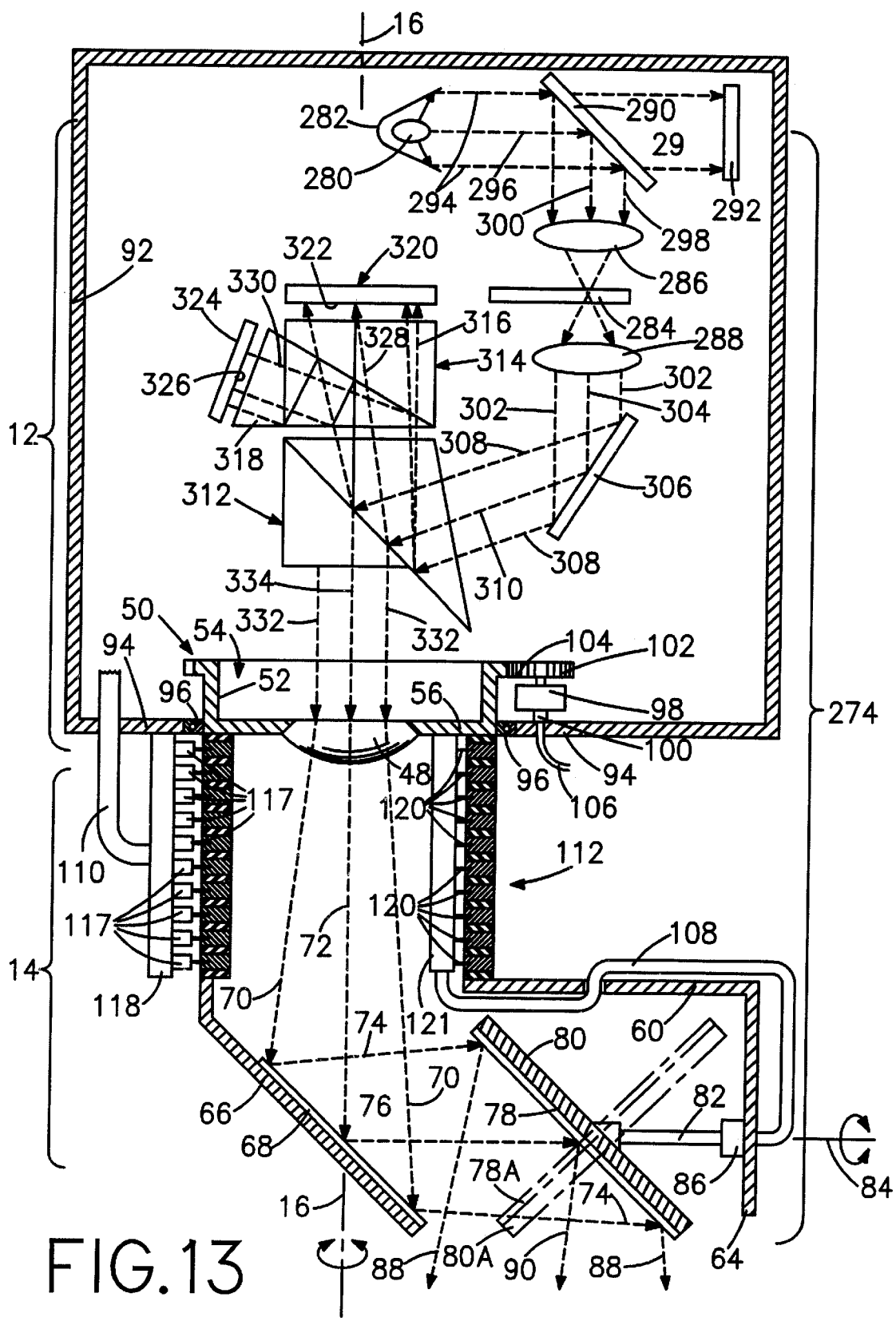
FIG. 13 is a schematic sectional side view of an embodiment of the present invention that includes a color wheel, a cold mirror with a heat sink and a TIR prism engaged with a 2-color splitting prism assembly with two DMD chips mounted in a fixed housing.

FIG. 13 illustrates a DMD light display system 274 basically analogous to DMD light display systems 10, 128, and 158 shown in FIGS. 3, 5, and 12 that includes a fixed housing 12 and a rotatable housing 14 with the same reference numerals being shown for identical or similar parts.

A luminaire mounted in fixed housing 12 comprises a lamp 280 with a reflector 282, a color wheel 284 positioned between a pair of focus lenses 286 and 288, a cold mirror 290, and a heat sink 292. Lamp 280 is deficient in the red light and color wheel 284 has yellow and magenta filters.

A first light beam 294 containing a first light ray 296 is directed at cold mirror 290, which passes certain non-visible wave lengths of the light spectrum shown as light rays 297 to heat sink 292. Cold mirror 290 reflects a second light beam 298 including a central light ray 300 through lens 286 to color wheel 284 and therefrom through lens 288 as a third light beam 302 including a central light ray 304 to a fold mirror 306, which reflects a fourth light beam 308 including a central light ray 310 to a TIR prism 312 which reflects light beam to a 2-color, or dichroic, prism assembly 314.

Dichroic prism assembly 314, which is shown in FIG. 13 schematically for purposes of illustration, includes a first prism 316 in proximity to TIR prism 312 that in turn adjoins a second prism 318 adjoining first prism 316. A first DMD 320 having a plurality of pixel mirrors 322 is secured proximate to first prism 316 and a second DMD 324 having a plurality of pixel mirrors 326 is secured proximate to second prism 318. A blue and green light beam 328 is split off to first DMD 320 for image digitization and a red light beam 330 is split off to second DMD 324 that is reflected as a recombined digitized light beam 332 analogous to digitized light beam 46 of FIG. 3 that contains a recombined digitized light ray 334 directed in a first optical path to a projection lens 48 mounted in cylindrical mounting member 50 from where a first expanded first cone-shaped digital light beam 70 including a digitized central light ray 72 that is aligned with axis of rotation 16 and is directed to a fixed mirror 66 and is reflected therefrom as second cone-shaped digital light beam 74 including a second expanding digitized light beam 74 including a central digital light ray 76 that is aligned with axis of rotation 84 and which in turn impinges upon rotatable mirror 78 and is reflected therefrom as a third expanding cone-shaped digital light beam 88 including a third central light ray 90. Digital light beam 88 is directed to a stage display (not shown) that such as stage display 36 shown in FIG. 1. Digital control signals from a computer that are written to the addressing circuitry including the Static Ram (SRAM) of each DMD 320 and 324 are structured to combine the split color spectrums into color combinations in synchronization with the bistable rotations of each pixel mirror 322 of DMD 320 and of each pixel mirror 326 of DMD 324.

Operation of tilt motor 86 rotates rotatable mirror 78 with mirror support 80 from its initial position about axis of rotation 84 as indicated with rotatable mirror 78A with mirror support 80A rotated over 90 degrees as shown in phantom line. The actual direction of digitized light beam 88 with central light ray 90 varies from being perpendicular to axis of rotation 84 depending upon the rotated position of rotatable mirror 78. Digitized light beam 88 with central light ray 90 are rotatable over 360 degrees in a position lateral to axis of rotation 16. Pan motor 98 and tilt motor 86 are operable either individually or simultaneously.

The particular architecture of light display system 274 is set forth in the previously mentioned article entitled "Display System Architectures for Digital Micromirror Device (DMD) Based Projectors", by James M. Florence and Lars A. Yoder, published July, 1996, Proc. SPIE, Vol. 2650, in a sub-heading entitled "2 DMD System Architecture" on pages 202–205. The advantage of the 2-DMD system is stated therein to be that the blue and green light output is increased over other light display systems and that the 2-DMD system is very optically efficient.

As set forth in the cited article, color wheel 284 uses the mentioned secondary colors, magenta and yellow with the net result that red light is on at all times and blue and green are activated with the rotation of color wheel 284 and so are on for about half the time. At dichroic prism assembly 314, red light is directed to DMD 320 and blue and green light are directed to DMD 324.

Figure 14:
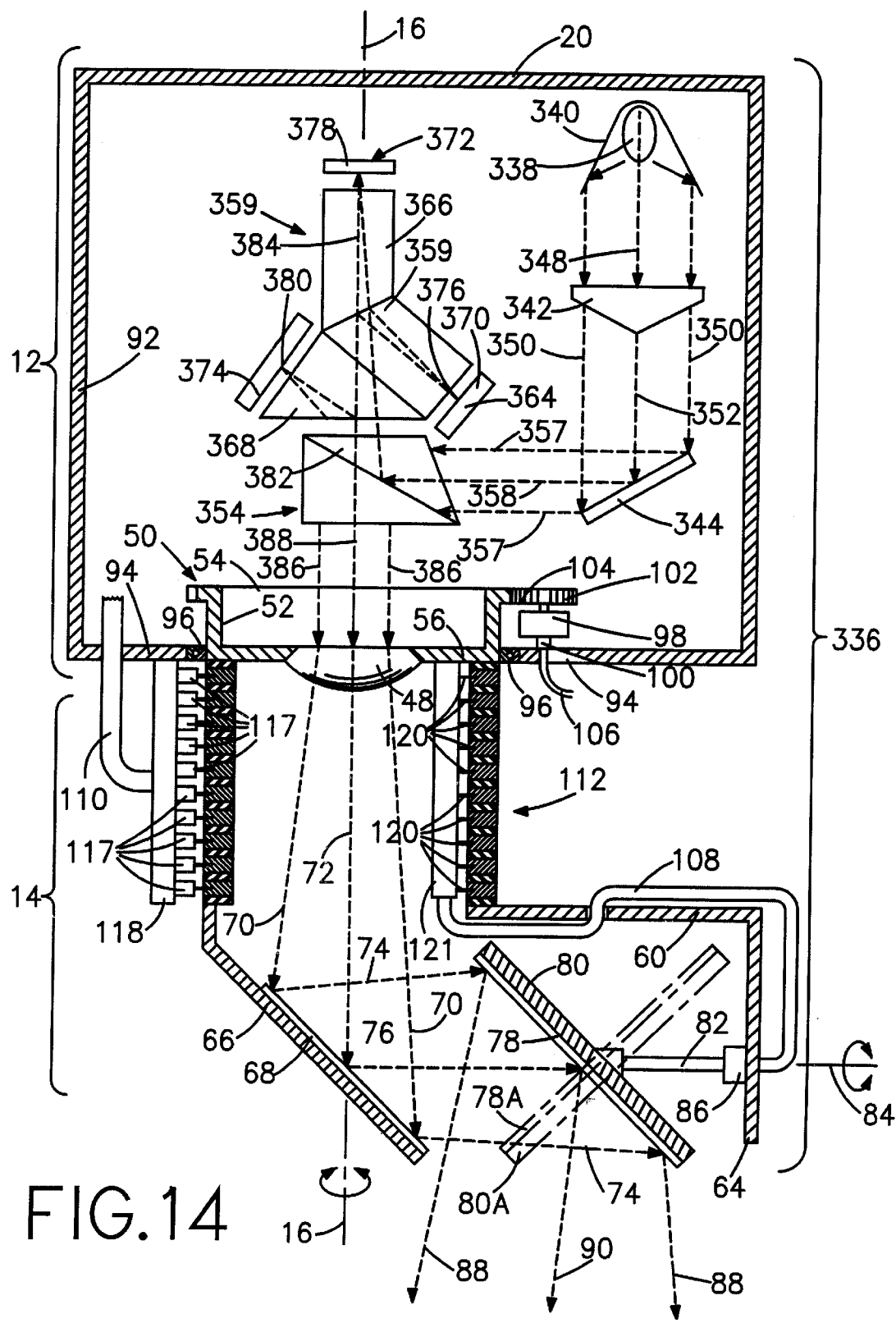
FIG. 14 is a schematic sectional side view of an embodiment of the present invention that includes a TIR prism engaged with a 3-color splitting prism assembly with three DMD chips mounted in a fixed housing.

FIG. 14 illustrates a DMD light display system 336 basically analogous to light display systems 10, 128, 158, and 232 shown in FIGS. 3, 5, 10, and 12 and that includes a fixed housing 12 and a rotatable housing 14.

A luminaire comprising a lamp 338 with a reflector 340 is combined with a condenser lens 342 and a fold mirror 344. A first white light beam 346 containing a central first light ray 348 generated by lamp 338 is directed at fold mirror 344, which reflects a second white light beam 350 containing an exemplary second light ray 352 onto onto fold mirror 344. A Total Internal Reflecting (TIR) prism 354 adjoins an optical architecture comprising a three-primary color prism assembly 356. A third white light beam 357 containing an exemplary third light ray 358 is directed at TIR prism 354. A three color prism assembly 359 comprises three prism units 358, 360, and 362. Prism 358 adjoins TIR prism 354, prism 360 adjoins prism 358, and prism 362 adjoins prism 360. A first DMD 364 is mounted onto prism 360, a second DMD 366 is mounted onto prism 358, and a third DMD 368 is mounted onto prism 360. Three color prism assembly 356 in combination with DMDs 364, 366 and 368 combine to split the white light beam 350 into the red, green, and blue spectrums and in addition are structured to combine the three-spectrums into color combinations as directed by signals from a computer that are written to each Static Ram (SRAM) of each DMD 364, 366, and 368. The structure of prisms 356, 358, and 360 combined with DMDs 362, 364 and 366 are known in the art and are described in the article described earlier herein, namely, "Display System Architectures for Digital Micromirror Device (DMD) Based Projectors," which has been incorporated into the present application.

Each DMD 364, 366, and 368 includes a surface array 370, 372, and 374, respectively, each of which includes a plurality of pixel mirrors, or pixels, each successively represented as a single exemplary pixel mirror 376, 378, and 380, respectively. After each color-splitting prism 358, 360, and 362 has split white light beam 350 into the three primary colors, each primary color is directed to the DMD assigned to that primary color where the primary color is digitized by pixels 378, 380, and 382. White light ray 352 strikes upon and is then reflected from surface 382 of TIR prism 354 into 3-color prism assembly 356 where split light rays 384 are generally indicated as illustrative of general splits of primary-color light rays to DMDs 364, 366, and 368 for digitization and emergence therefrom as colored digitized light rays. A colored digitized light beam 386 analogous to digitized light beam 46 of FIG. 3 containing a light ray 388 is shown emerging from 3-primary color prism assembly 356 along a first optical path directed to projection lens 48.

In the same manner as previously described for DMD light display systems 10, 128, 158, and 232, digitized beam 388 continues from projection lens 48 as a first expanding cone-shaped digitized light beam 70 including exemplary digitized central light ray 72 to fixed mirror 66 which reflects a second expanding cone-shaped digitized light beam 74 including exemplary digitized central light ray 76 along axis of rotation 84 to rotatable mirror 78 which reflects a third expanding cone-shaped light beam 88 including exemplary central digitized light ray 90 directed in perpendicular to axis of rotation 84 to a stage display such as stage rear wall 162 shown in FIG. 10.

Operation of tilt motor 86 rotates rotatable mirror 78 with mirror support 80 from its initial position about axis of rotation 84 with rotatable mirror 78A with mirror support 80A rotated over 90 degrees as shown in phantom line. The actual direction of digitized light beam 88 with central light ray 90 varies from being perpendicular to axis of rotation 84 depending upon the rotated position of rotatable mirror 78. Digital light beam 88 with central light ray 90 are rotatable over 360 degrees lateral to axis of rotation 16. Pan motor 98 and tilt motor 86 are operable either individually or simultaneously.

The architecture of DMD light display system 336 is set forth in the previously mentioned article entitled "Display System Architectures for Digital Micromirror Device (DMD) Based Projectors", by James M. Florence and Lars A. Yoder, published July, 1996, Proc. SPIE, Vol. 2650, pp. 193–208. The particular architecture of light display system 330 is described in a sub-heading entitled "3-DMD System Architecture" on pages 200–201. The 3-DMD architecture is also discussed in the article previously mentioned entitled "Digital Light Processing for High-Brightness, High Resolution Applications," previously mentioned and incorporated into the present application. The advantage of the 3-DMD architecture has several advantages for a large screen application including a bright projected image than other DMD architectural systems.

Figure 15:
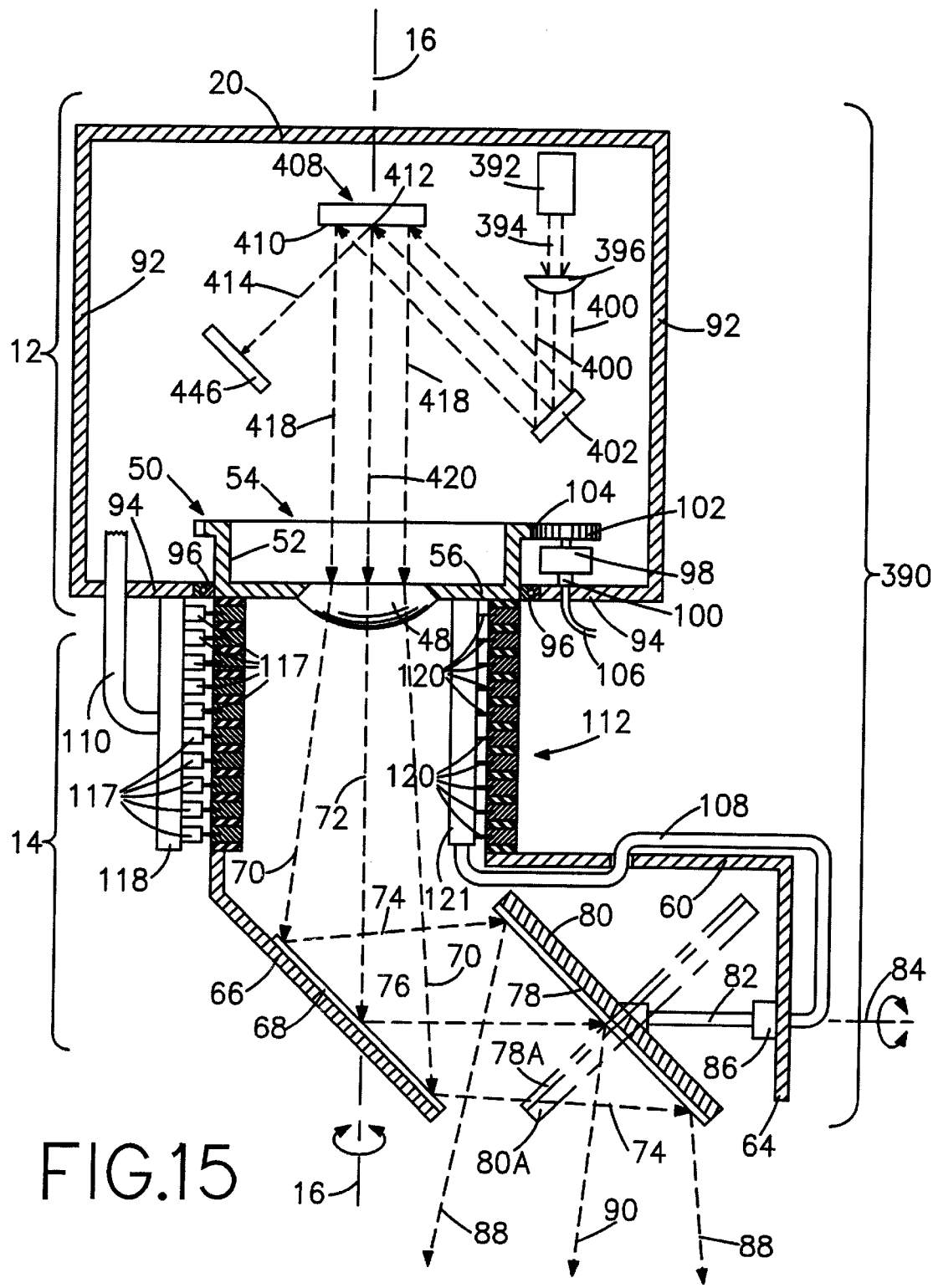
FIG. 15 is a schematic sectional side view of an embodiment of the present invention that includes a single laser generating a light beam, a fold mirror, and a DMD mounted in a fixed housing.

FIG. 15 illustrates a DMD light display system 390 basically analogous to DMD light display systems 10, 128, 158, 232, and 336. DMD light display system 390 is mounted in a fixed housing 12 and a rotatable housing 14.

DMD light display system 390 includes a single laser 392 that generates a first white light beam 394 that is expanded at lens, or beam expander, 396 into an expanded second white light beam 400 that is reflected at fold mirror 402 into a third white beam 404 including a central white light ray 406 that is directed to a DMD 408 that includes a surface array 410 comprising a plurality of pixel mirrors represented by a pixel 412. Third white light beam 404 strikes surface array 410 with expository central white light ray 406 striking an expository pixel mirror 412. Pixel mirrors 412 are rotated into one of two directions in response to signals sent from a computer (not shown), one direction being such that digitized light represented by a deflected light ray 414 is directed to a light stop 416, and the other direction being such that a reflected white light beam 418 that has been both digitized and imaged by the rotational movements of the plurality of pixels 412 of DMD 408. Digitized light beam 418 is analogous to digitized light beam 46 of FIG. 3 and contains a central digitized light ray 420. Control signals sent to the addressing circuitry of DMD 408 causes pixels 412 to modulate white light beam 404 into imaged digitized light beam 418. Imaged digitized white light beam 418 is directed to a projection lens 48 along a first optical path described in DMD light display systems 10, 128, 158, 232, and 336 from where digital white light beam 418 continues from projection lens 48 as a first expanding cone-shaped digitized light beam 70 including exemplary digitized central light ray 72 to fixed mirror 66 which reflects a second expanding cone-shaped digitized light beam 74 including exemplary digitized central light ray 76 along axis of rotation 84 to rotatable mirror 78 which reflects a third expanding cone-shaped light beam 88 including exemplary central digitized light ray 90 directed perpendicular to axis of rotation 84 to a stage display such as stage rear wall 162 shown in FIG. 10.

Operation of tilt motor 86 rotates rotatable mirror 78 with mirror support 80 from its initial position about axis of rotation 84 with rotatable mirror 78A with mirror support 80A rotated over 90 degrees as shown in phantom line. The actual direction of digitized light beam 88 with central light ray 90 varies from being perpendicular to axis of rotation 84 depending upon the rotated position of rotatable mirror 78. Digitized light beam 88 with central light ray 90 is rotatable over 360 degrees in a position lateral to axis of rotation 16. Pan motor 98 and tilt motor 86 are operable either individually or simultaneously.

DMD 408 optionally performs a process of adding color by digitizing laser 392 at a lower frequency rate than the integration time for color of the human eye, which is to be distinguished from the CFF of the human eye. This chrominance generation is discussed in U.S. Pat. Nos. 5,192,946 and 5,079,544, referred to previously and incorporated herein especially on pages 12, 13, and 14 of the former mentioned patents.

Color can also be added to DMD light display system 390 by use of a multi-mode, or tunable, laser for single laser 392 in a manner described in U.S. Pat. No. 5,079,544, column 14, lines 32–35. The addition of color is accomplished by tuning the single multi-mode laser to the selected frequency for the color that is desired.

In the same manner as previously described for DMD light display systems 10, 128, 158, and 232, digitized beam 418 continues from projection lens 48 as a first expanding cone-shaped digitized light beam 70 including exemplary digitized central light ray 72 to fixed mirror 66 which reflects a second expanding cone-shaped digitized light beam 74 including exemplary digitized central light ray 76 along axis of rotation 84 to rotatable mirror 78 which reflects a third expanding cone-shaped light beam 88 including exemplary central digitized light ray 90 directed perpendicular to axis of rotation 84 to a stage display such as stage rear wall 162 shown in FIG. 10.

Operation of tilt motor 86 rotates rotatable mirror 78 with mirror support 80 from its initial position about axis of rotation 84 with mirror support 80A rotated over 90 degrees as shown in phantom line. The actual direction of digitized light beam 88 with central light ray 90 varies from being perpendicular to axis of rotation 84 depending upon the rotated position of rotatable mirror 78. Digitized light beam 88 with central light ray 90 is rotatable over 360 degrees in a position lateral to axis of rotation 16. Pan motor 98 and tilt motor 86 are operable either individually or simultaneously.

Figure 16:
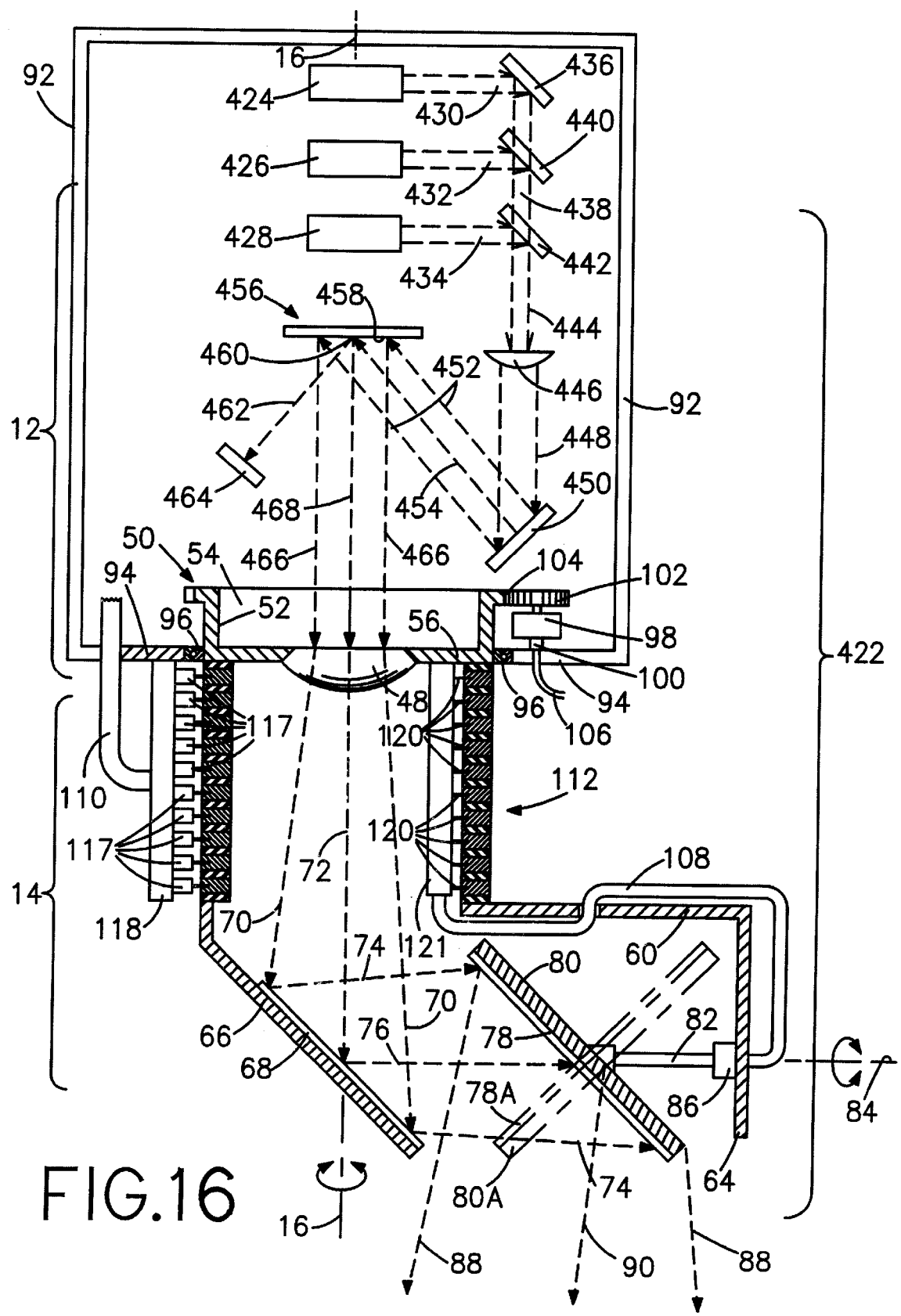
FIG. 16 is a schematic sectional side view of an embodiment of the present invention that includes three separate laser beam generators, a fold mirror, and a DMD mounted in a fixed housing.

FIG. 16 illustrates a DMD light display system 422 basically analogous to light display systems shown in DMD light display systems 10, 128, 158, 232, 336 and 390. DMD light display system 390 is mounted in a fixed housing 12 and a rotatable housing 14.

DMD light display system 422 includes a green laser 424, a red laser 426, and a blue laser 428. Green laser 424 produces a beam of green light along a green optical path 430, red laser 426 produces a beam of red light along a red optical path 432, and blue laser 428 produces a beam of blue light along a blue optical path 434. A mirror 436 passes the green light beam from optical path 430 through to an optical path 438. A first combining mirror 440 redirects the beam of red light from optical path 432 to the same optical path 438. A second recombining mirror 442 positioned in optical path 438 passes the green and red light from optical path 438 to an optical path 444 and also redirects the beam of blue light from optical path 434 to optical path 444. A lens 446 expands the resulting beam of combined color laser light beam in optical path 444 to an enlarged combined color laser light beam along an optical path 448 that is directed to a fold mirror 450. The beam of combined color laser light beam in optical path 448 is reflected from fold mirror 450 as a reflected combined color laser light beam 452 that includes an expository central laser light ray 454 that is directed to a DMD 456 that includes a surface array 458 comprising a plurality of pixel mirrors represented by an expository pixel 460. Combined color laser light beam 452 strikes surface array 410 with expository central color laser light ray 454 impinging upon an expository pixel mirror 460. Pixel mirrors 460 are rotated into one of two directions in response to signals sent from a computer (not shown), one direction being such that reflected light represented by a deflected light ray 462 is directed to a light stop 464, and the other direction being such that a reflected colored light beam 466 that has been both digitized and imaged by the rotational movements of the plurality of pixels 460 of DMD 456. Digitized light beam 466 is analogous to digitized light beam 46 of FIG. 3 and contains a central digitized light ray 468. Control signals by a computer (not shown) sent to the addressing circuitry of DMD 456 causes pixels 460 to modulate colored laser light beam 452 into imaged digitized light beam 468. Imaged digitized colored laser light beam 466 is directed along a first optical path to a projection lens 48 described in DMD light display systems 10, 128, 158, 232, 336 and 390 from where digital digitized colored laser light beam 466 continues from projection lens 48 as a first expanding cone-shaped digitized light beam 70 including exemplary digitized central light ray 72 to fixed mirror 66 which reflects a second expanding digitized light beam 74 including exemplary digitized central light ray 76 along axis of rotation 84 to rotatable mirror 78 which reflects a third expanding cone-shaped light beam 88 including exemplary central digitized light ray 90 directed perpendicular to axis of rotation 84 to a stage display such as stage rear wall 162 shown in FIG. 10.

Operation of tilt motor 86 rotates rotatable mirror 78 with mirror support 80 from its initial position about axis of rotation 84 with rotatable mirror 78A with mirror support 80A rotated over 90 degrees as shown in phantom line. The actual direction of digitized light beam 88 with central light ray 90 varies from being perpendicular to axis of rotation 84 depending upon the rotated position of rotatable mirror 78. Digitized light beam 88 with central light ray 90 are ratable over 360 degrees in a position lateral to axis of rotation 16. Pan motor 98 and tilt motor 86 are operable either individually or simultaneously.

Figure 17:
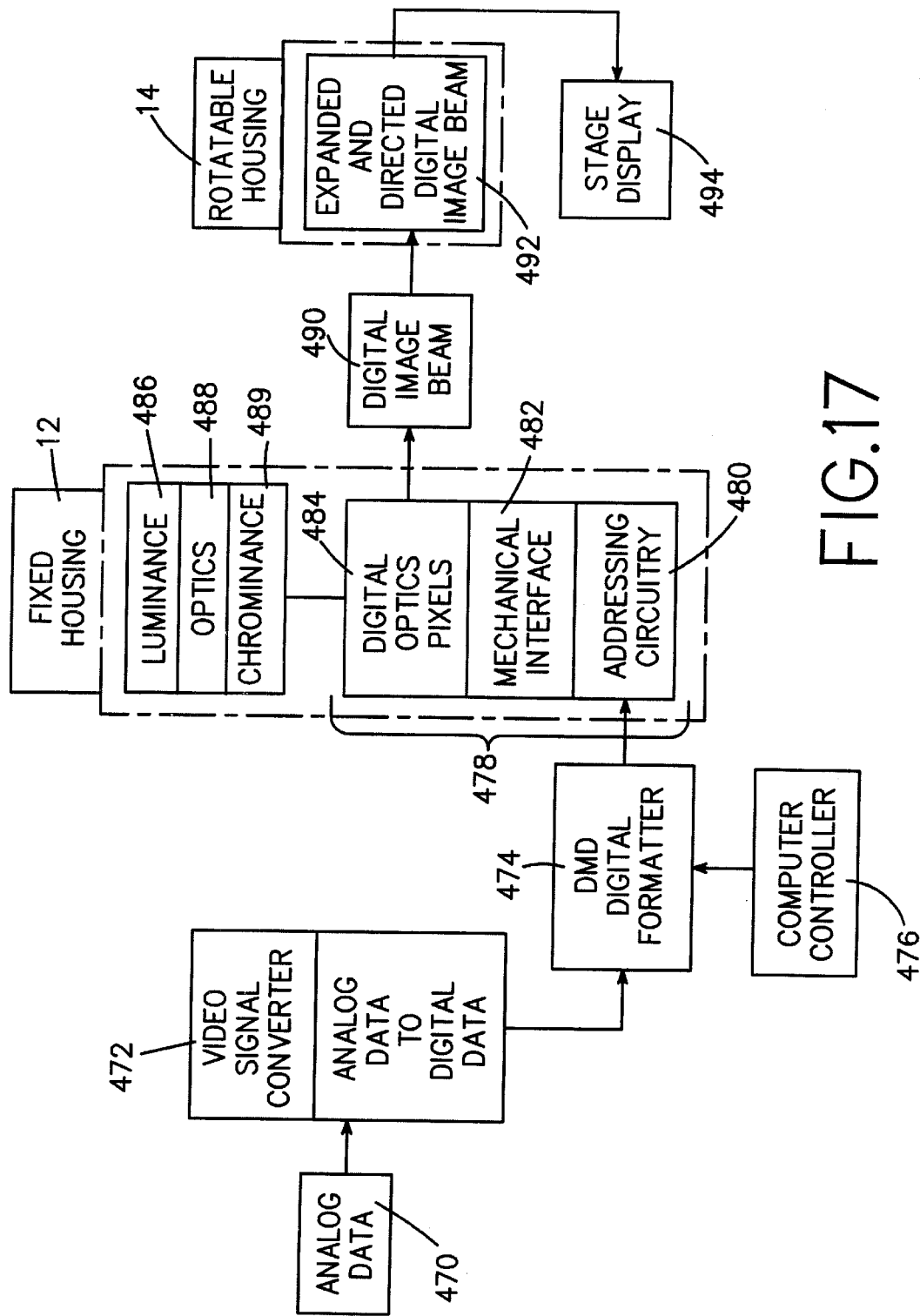
FIG. 17 is a basic block diagram of the creation of the DMD digital image beam and its projection onto a stage display of the present invention.

FIG. 17 is a block diagram of the basic aspect of the embodiments of the lighting display systems disclosed herein. Analog data 470, when that is the basic available data, is converted to digital data at a video signal analog-to-digital image data converter 472. The digital image data is then prepared for application to a DMD at a DMD digital formatter 534. The prior mentioned DMD light display systems 10, 128, 158, 232, 336, 390, and 422 can be contained in a single processing unit 476. Once digital formatting is accomplished, control signals are directed to the addressing circuitry 478 that includes SRAM memory cells of a DMD 478 that comprises addressing circuitry 480, mechanical interface 482, and digital optics, that is, a plurality of bistable pixel mirrors 484, which are mounted in fixed housing 12 (shown in phantom line), which has been described in relation to DMD light display systems 10, 128, 158, 232, 336, 390, and 422. Control signals sent to addressing circuitry 480 directs the DMD mechanical interface 482 that controls the bistable rotations of the array of pixel mirrors that comprise the surface array of DMD 478. Luminance 486, which can include a either a lamp or lasers, the digital optics 488, including cold mirrors and heat sinks, various types of lenses previously described in relation to DMD light display systems 10, 128, 158, 232, 336, 390, and 422 and fold mirrors, and a system chromitizer, or colorer, 489 such as color wheel 134 shown to in FIG. 5, or such as laser 392 when it is a multimode type of laser, or such as primary color lasers 424, 426, and 428 shown in FIG. 16, or such as dichroic prism assembly 314 combined with a color wheel, or such as color splitting prisms 358 are also mounted in fixed housing 12 are operationally synchronized with digital optics/pixels 484. Digital optics 488 directs an expanding digital image beam 490 to a rotatable housing 14 previously described having fixed and rotatable mirrors indicated as expanding and directed digital image beam 492, which is controlled by the fixed mirrors 66 and rotatable mirrors 78 (not indicated in FIG. 17) previously described. Expanding and directed digital image beam 492 is directed to a stage display 494 such stage display 162 shown in FIG. 10.

Figure 18:
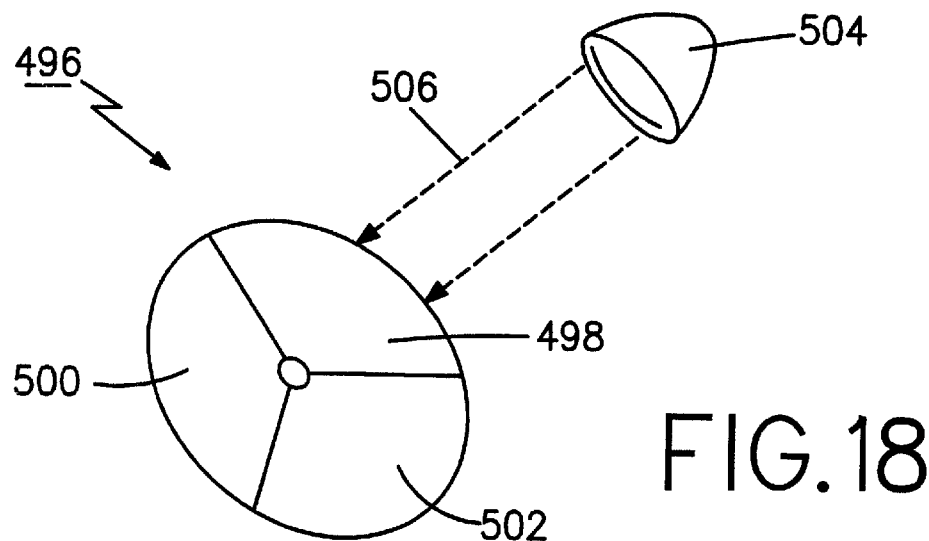
FIG. 18 is a simplified perspective view of a single color wheel of the type with three colored lenses.

FIG. 18 shows a standard rotatable single color wheel 496 that can be used for color wheel 134 shown in FIG. 5 for DMD light display system 128; for color wheel 242 shown in FIG. 12 for DMD light display system 232; and for color wheel 284 shown in FIG. 13 for DMD light display system 274. Single color wheel 496 includes a triangle of the three primary color filters, namely, a red filter 498, a green filter 500, and a blue filter 502. Color wheel 496 rotates continuously so that all three filters 498, 500, 502 are interposed into the optic path of a white light beam generated by a luminaire 504 to form a colored light beam 506 that is subsequently directed to a DMD in accordance to programmed instructions received from a CPU.

Figure 19:
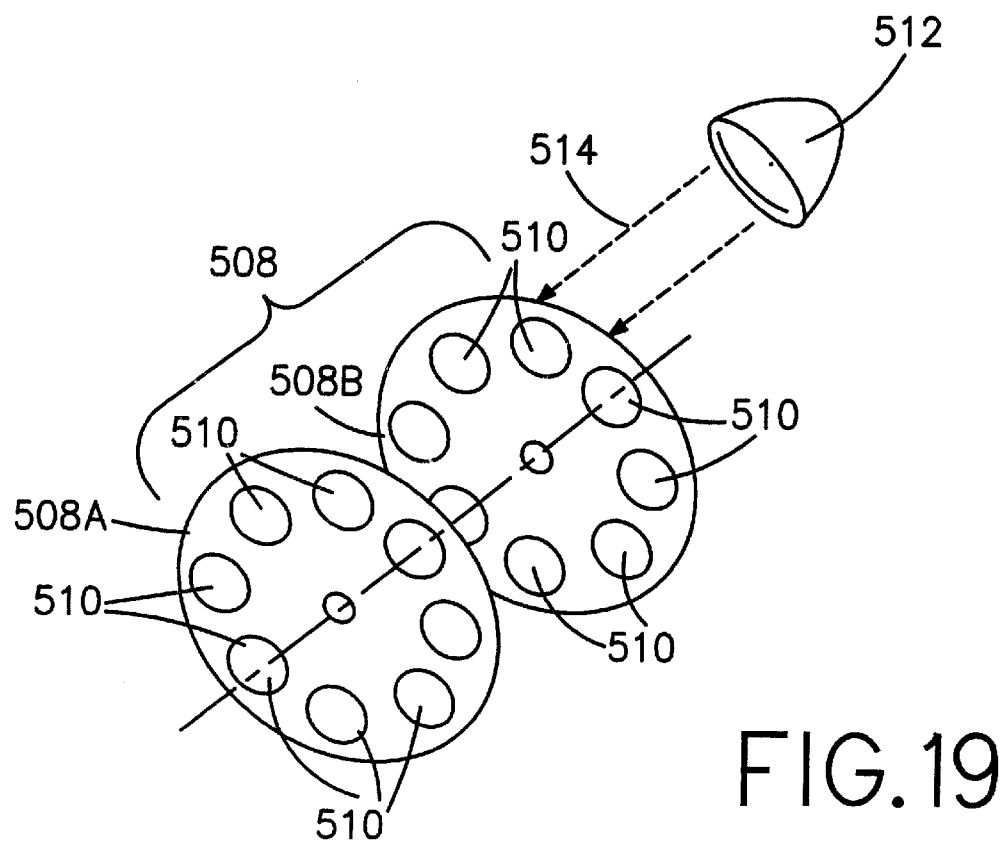
FIG. 19 is a simplified perspective of a double color wheel of the type with a plurality of colored filters at the perimeters.

FIG. 19 shows a double color wheel 508 comprising two rotatable colors wheels 508A and 508B that can be used for color wheel 134 shown in FIG. 5 for DMD light display system 128; and for color wheel 242 shown in FIG. 12 for DMD light display system 232. A light source 512 generates a white light beam 514 that is directed into double color wheel 508 from where a colored light beam emerges that is directed to a DMD. Each color wheel 508A and 508B includes a plurality of circular color filters, shown as eight color filters 510 for each color wheel 508A and 508B for purposes of exposition only. Each color filter 510 of the eight color filters could used to create a gobo-based image, that is, the DMD 36 of the above-named DMD light display systems could be used as a gobo generating imager and such a configuration would not allow for the projection of a full color motion image. Double color wheel 508 provides more vivid colors and greater light output that each color wheel 508A or 508B being used alone.

Figure 20:
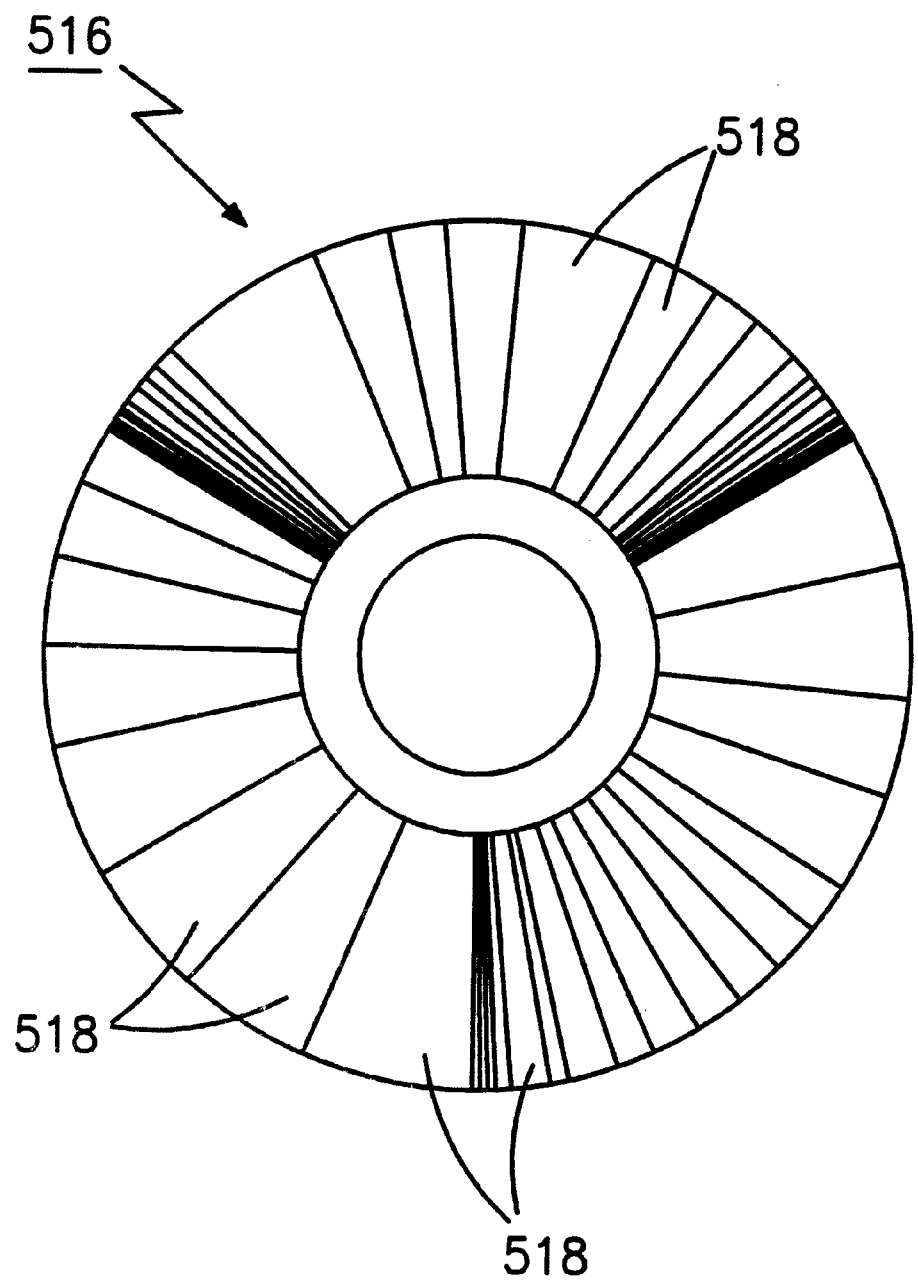
FIG. 20 is a front view of a spinnable color wheel having a plurality of color filters.

FIG. 20 shows a single color wheel 516 that can be used for example for color wheel 134 shown in FIG. 5 for DMD light display system 128 and for color wheel 242 shown in FIG. 12 for DMD light display system 232. A white light beam generated by a white light source is formed into a colored light beam by color wheel 516 into a colored light beam that is directed to a DMD. Color wheel 516 includes a plurality of varying color filter wedge sections 518. Each color wheel wedge section 518 filters all the colors except the color filter positioned in the optic path of the light beam from the light source that is eventually directed to a DMD. Color wheel 516 can be used for control both luminance and coloring.

Luminance and coloring of the DMD light display systems can be controlled by the modulation rate of the mirror pixels of the DMD which can be switched between reflected and deflected modes at a time period of 20 microseconds, which is a rate 833 times than the CFF of the human eye for a bright image. (See column 13, lines 13–19 of U.S. Pat. No. 5,079,544, referred to previously and incorporated herein.) As the switching rate, or modulation rate, of the mirror pixels of the DMD decreases from the 20 microseconds, less light is directed to the stage display.

Discussion of luminance and chrominance is discussed on page 13, lines 1–68 in U.S. Pat. No. 5,192,946, which has been previously incorporated into the present application.

The embodiments of the invention particularly disclosed and described hereinabove are presented merely as examples of the invention. Other embodiments, forms, and modifications of the invention coming within the proper scope and spirit of the appended claims will, of course, readily suggest themselves to those skilled in the art. Other embodiments or modifications are intended to be reserved especially as they fall within the scope and spirit of the subjoined claims.

What is claimed is:

1. A light display system comprising:
    a fixed first housing having a light source that generates a light beam and a first micromirror device that generates an digital light beam from said light beam and directs said digital light beam along a first optical path;
    a projection lens that directs said digital light beam along a second optical path;
    a rotatable second housing connected to and rotatable relative to said fixed first housing about a first axis, said rotatable second housing having a fixed reflector that directs said digital light beam along a third optical path, and a rotatable reflector that is rotatable about a second axis and adapted to direct said digital light beam along a fourth optical path onto a stage display;
    a digital signal controller that controls said micromirror device to reflect said digital light beam along said first optical path;
    means for rotating said rotatable second housing about said first axis;
    means for rotating said rotatable reflector about said second axis; and
    a substantially totally internally reflective prism between said first micromirror device and said projection lens.

2. The light display system according to claim 1, wherein said light source includes a luminaire containing a lamp and a reflector.

3. The light display system according to claim 1, wherein said projection lens is mounted in said fixed housing.

4. The light display system according to claim 1, wherein said projection lens is mounted in said rotatable housing.

5. The light display system according to claim 1, further including a cold mirror and a heat sink mounted in said fixed first housing proximate to said light source.

6. The light display system according to claim 1, further including means for rotating said rotatable second housing with said rotatable reflector in a predetermined sequence of combined movements about said first axis of rotation and said second axis of rotation.

7. The light display system according to claim 6, wherein said predetermined sequence of combined movements are synchronized in predetermined timed and spatial sequences with said digitally selected light beam being reflected from said micromirror device and directed onto a stage display.

8. The light display system according to claim 1, wherein said first axis of rotation and said second axis of rotation are in perpendicular alignment.

9. The light display system according to claim 8, wherein said rotatable reflector directs said digital light beam wherein said fourth optical path is perpendicular to said second axis of rotation.

10. The light display system according to claim 1, wherein said fixed reflector is positioned at approximately 45 degrees to said first axis of rotation and directs said digital light beam at approximately 90 degrees from said first axis of rotation along said second optical path in alignment with said second axis of rotation and said rotatable reflector is positioned at approximately 45 degrees to said second axis of rotation and directs said digital light beam at approximately 90 degrees from said second axis of rotation in generally parallel alignment with said first axis of rotation.

11. The light display system according to claim 10, wherein said rotatable reflector is rotatable over 360 degrees about said second axis of rotation, whereby said digital light beam is reflected in said fourth optical path over 360 degrees.

12. The light display system according to claim 1, wherein said micromirror device comprises a plurality of deformable mirror cells, each of said deformable mirror cells being rotatable between a first position and a second position, wherein the first position directs a light ray on said first optical path as a digital light ray, and wherein the second position directs a light ray away from said first optical path as a deflected light ray.

13. The light display system according to claim 12, further including an opaque light stop mounted in said fixed housing, said deflected light ray being directed to said opaque light stop.

14. The light display system according to claim 1, further comprising a second micromirror device and a third micromirror device, and wherein said dichroic prism assembly comprises a first prism, a second prism, and a third prism, said dichroic prism assembly combined with said first, second, and third micromirror devices to split said light beam into red, green, and blue digital light beams.

15. The light display system according to claim 14, wherein said digital signal means includes digital data relating to digital control signals for said first, second, and third micromirror devices for directing said red, green, and blue digital light beams into selected color combinations.

16. The light display system according to claim 1, wherein said rotatable second housing includes a cylindrical mounting member positioned between said micromirror device and said fixed reflector, said cylindrical mounting member having a cylindrical passage axially aligned with said first axis, said micromirror device directing said digital light beam through said cylindrical passage along said first optical path to said fixed reflector.

17. The light display system according to claim 16, wherein said projection lens is mounted in said cylindrical mounting member in said rotatable housing.

18. The light display system according to claim 16, further including a slip-ring connector mounted with said cylindrical mounting member, said slip ring connector having inner and outer electrical contact surfaces in operative electrical connection, said light display system further including a source of electrical power and first and second electrical connectors electrically connecting said first and second drive means, respectively, to said source of electrical power, said second connector including a first electrical conductor having a first electrical contact connecting said second drive means with said with said inner electrical contact surface of said slip-ring connector and with said source of electrical power, whereby said rotatable second housing is adapted to rotate about said first axis of rotation while keeping in electrical contact with said source of electrical power.

19. The light display system according to claim 18, wherein said slip-ring connector is a cylindrical slip-ring connector integral with said cylindrical mounting member.

20. The light display system according to claim 1, wherein said light source is a single laser that generates a white light beam.

21. The light display system according to claim 20, wherein said single laser is a multimode laser tunable to different frequencies of the visible spectrum so as to produce selected colors for said light beam that impinges upon said micromirror device.

22. The light display system according to claim 21, wherein said digital signal controller includes digital data relating to coloring and luminance activating said multimode laser to tune said multimode laser to different frequencies and intensities in synchronization with digital control signals to said micromirror device.

23. The light display system according to claim 1, further including a dichroic prism assembly positioned between said total internal reflective prism and said first micromirror device.

24. The light display system according to claim 23, further including a color wheel assembly positioned in an operative position within a selected one of said optical paths.

25. The light display system according to claim 24, further comprising a second micromirror device, whereby said dichroic prism assembly is adapted to direct blue and green digital light beams to said first micromirror device and digital red light beams to said second micromirror device.

26. The light display system according to claim 25, wherein said digital signal means includes digital data relating to coloring and luminance in synchronization with first digital control signals for activating said color wheel to different frequencies and intensities and in synchronization with second digital control signals for said first and second micromirror devices to combine said blue and green digital light beams and said red digital light beams in combination with digital light beams from said color wheel into selected color combinations.

27. The light display system according to claim 1, further including optical means for adding color to said digital light beam.

28. The light display system according to claim 27, wherein said light source and said optical means for adding coloring includes a color system comprising three lasers producing each of the primary colors, red, green, and blue that combine into said light beam that impinges upon said surface of said DMD.

29. The light display system according to claim 27, wherein said optical means includes a first focus lens system positioned proximate to said light source and a second focus lens system spaced from said first focus lens system and further includes at least one rotatable color wheel positioned between said first and second focus lens systems, said second focus lens system projecting said light beam to said micromirror device.

30. The light display system according to claim 29, wherein said light source generates a white light beam and said at least one rotatable color wheel includes a plurality of color filters wherein said white light beam is filtered into said color wheel during rotation of said color wheel so as to produce a plurality of colors of the visible spectrum.

31. The light display system according to claim 29, wherein said digital signal controller includes digital data relating to coloring and luminance activating said color wheel in synchronization with digital control signals to said micromirror device.

32. The light display system according to claim 31, wherein said at least one color wheel includes a plurality of individual color filters and selected individual filters are positioned to intercept said white light beam.

33. The light display system according to claim 32, wherein said at least one color wheel is two color wheels.

\* \* \* \* \*